(12) United States Patent
Geerits et al.

(10) Patent No.: US 8,811,114 B2
(45) Date of Patent: Aug. 19, 2014

(54) IMAGING OF FORMATION STRUCTURE AHEAD OF THE DRILL-BIT

(75) Inventors: Theodorus W. Geerits, Niedersachsen (DE); Thomas Bohlen, Karlsruhe (DE); Olaf Hellwig, Nossen (DE)

(73) Assignee: Baker Hughes Incorporated, Houston, TX (US)

( * ) Notice: Subject to any disclaimer, the term of this patent is extended or adjusted under 35 U.S.C. 154(b) by 363 days.

(21) Appl. No.: 13/210,504

(22) Filed: Aug. 16, 2011

(65) Prior Publication Data
US 2012/0069713 A1    Mar. 22, 2012

Related U.S. Application Data

(60) Provisional application No. 61/376,000, filed on Aug. 23, 2010.

(51) Int. Cl.
  *G01V 1/44* (2006.01)
  *G01V 1/48* (2006.01)
  *E21B 47/00* (2012.01)

(52) U.S. Cl.
  CPC .. *E21B 47/00* (2013.01); *G01V 1/48* (2013.01)
  USPC ............................................. 367/25; 367/99

(58) Field of Classification Search
  USPC ............. 367/25, 31, 35, 86, 99; 181/102, 105
  See application file for complete search history.

(56) References Cited

U.S. PATENT DOCUMENTS

| | | | |
|---|---|---|---|
| 4,209,854 A * | 6/1980 | Ruehle | 367/43 |
| 5,678,643 A | 10/1997 | Robbins et al. | |
| 5,971,095 A | 10/1999 | Ozbek | |
| 6,687,617 B2 | 2/2004 | Kelly | |
| 6,850,168 B2 | 2/2005 | Tang et al. | |
| 7,035,165 B2 | 4/2006 | Tang | |
| 7,310,580 B2 * | 12/2007 | Zhou et al. | 702/6 |
| 8,055,448 B2 * | 11/2011 | Mathiszik et al. | 702/11 |
| 2005/0034917 A1 * | 2/2005 | Mathiszik et al. | 181/108 |
| 2007/0097788 A1 * | 5/2007 | Tang et al. | 367/52 |
| 2008/0312839 A1 | 12/2008 | Mathiszik et al. | |

FOREIGN PATENT DOCUMENTS

WO    2008157366 A2    12/2008

OTHER PUBLICATIONS

Kimball, C.V., and Marzetta, T.L., Semblance processing of borehole acoustic array data. Geophysics 49, pp. 278-281 (1984).
Randall, C.J., Scheibner, D.J., and Wu, P.T., Multipole borehole acoustic waveforms: Synthetic logs with beds and borehole washouts. Geophysics 56, pp. 1757-1769 (1991).
Blias, E., VSP Wavefield Separation, Wave-by-Wave Approach, SEG Annual Meeting, Expanded Abstracts, pp. 2609-2613 (2005).

* cited by examiner

*Primary Examiner* — Ian J Lobo
(74) *Attorney, Agent, or Firm* — Mossman Kumar & Tyler PC

(57) ABSTRACT

The present disclosure is related to apparatuses and methods for downhole acoustic logging. The tool may be used for generating a guided borehole wave that propagates into the formation as a body wave, reflects from an interface, and is converted back into a guided borehole wave. Guided borehole waves resulting from reflection of the body wave are used to image a reflector. Methods may include processing of acoustic logging signals including: wavefield separation, auto-correlation of wavefield components, filtering using a dip filter, and estimating a distance to the reflective interface.

19 Claims, 22 Drawing Sheets

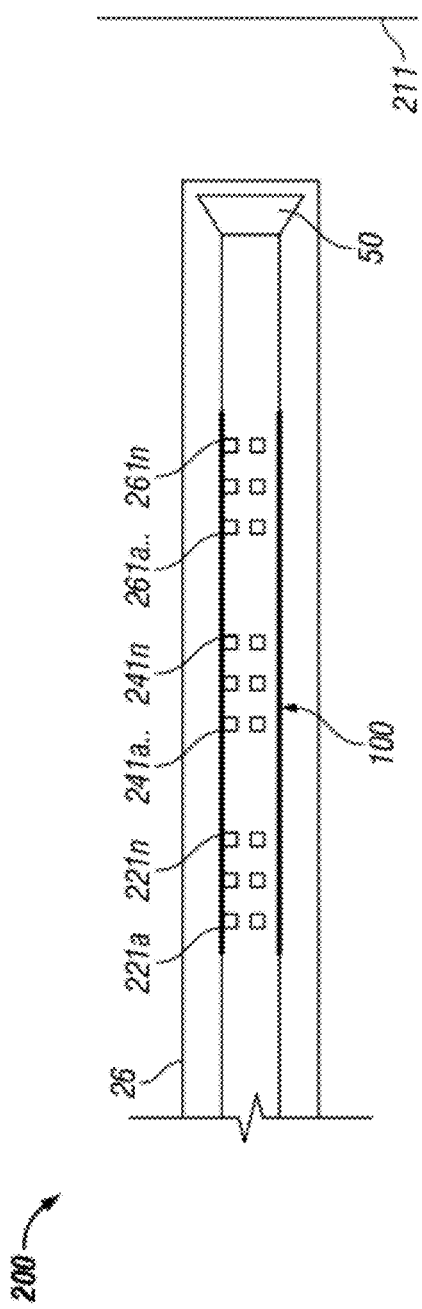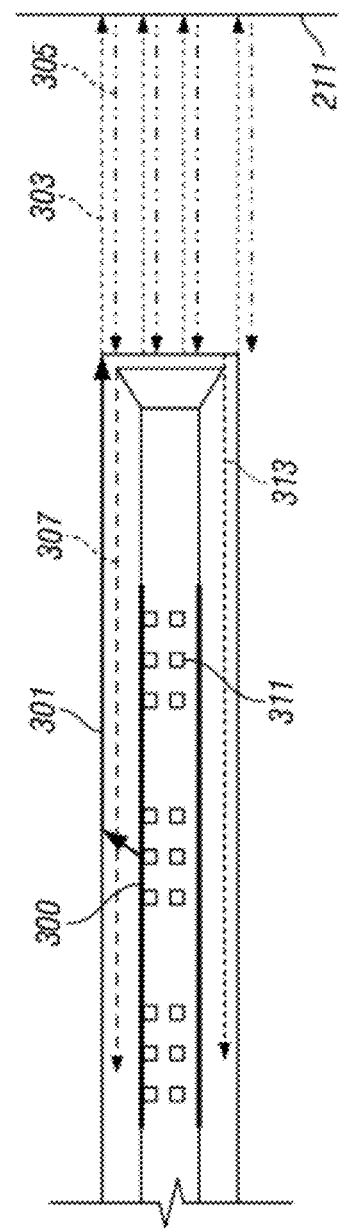

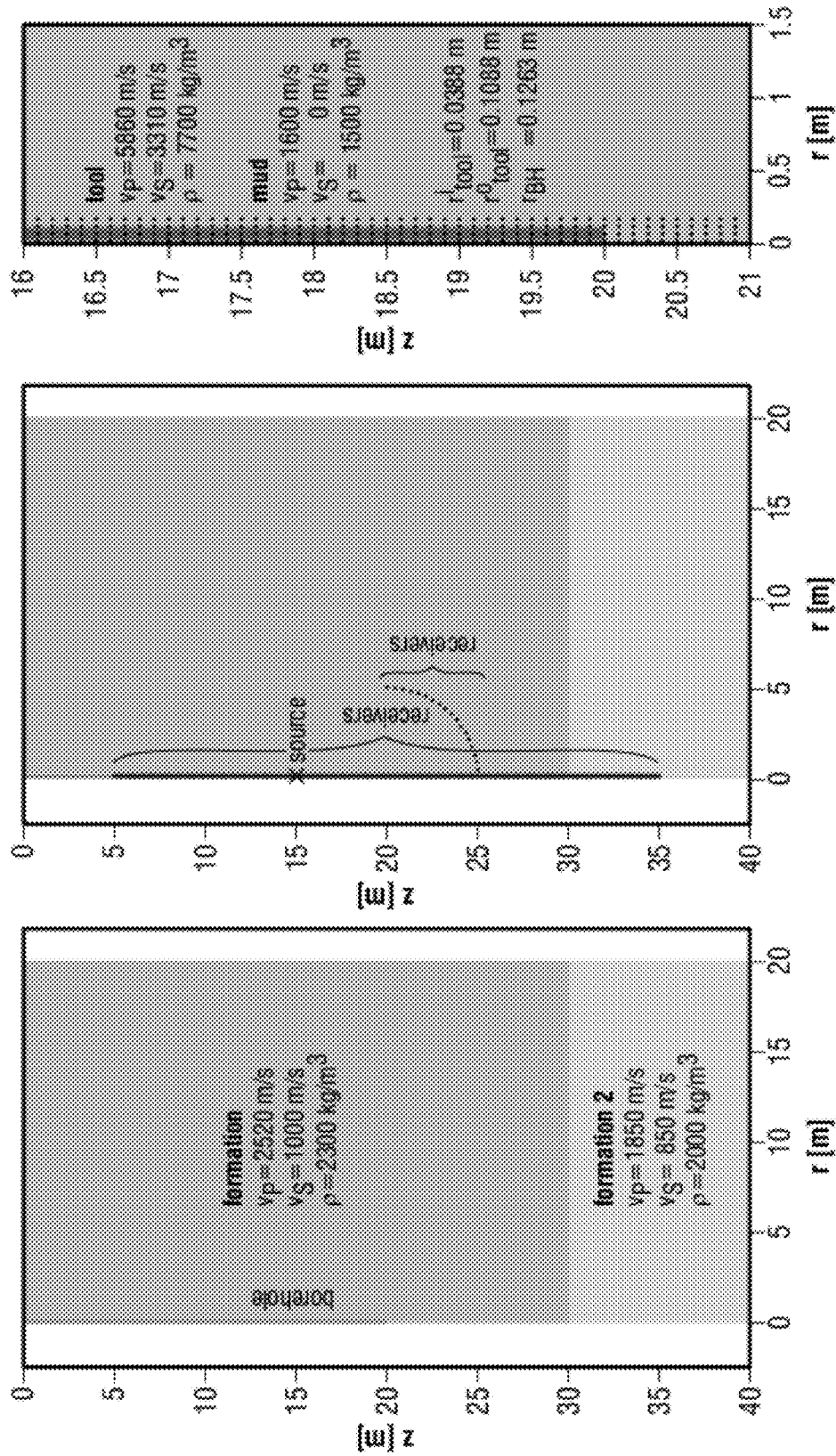

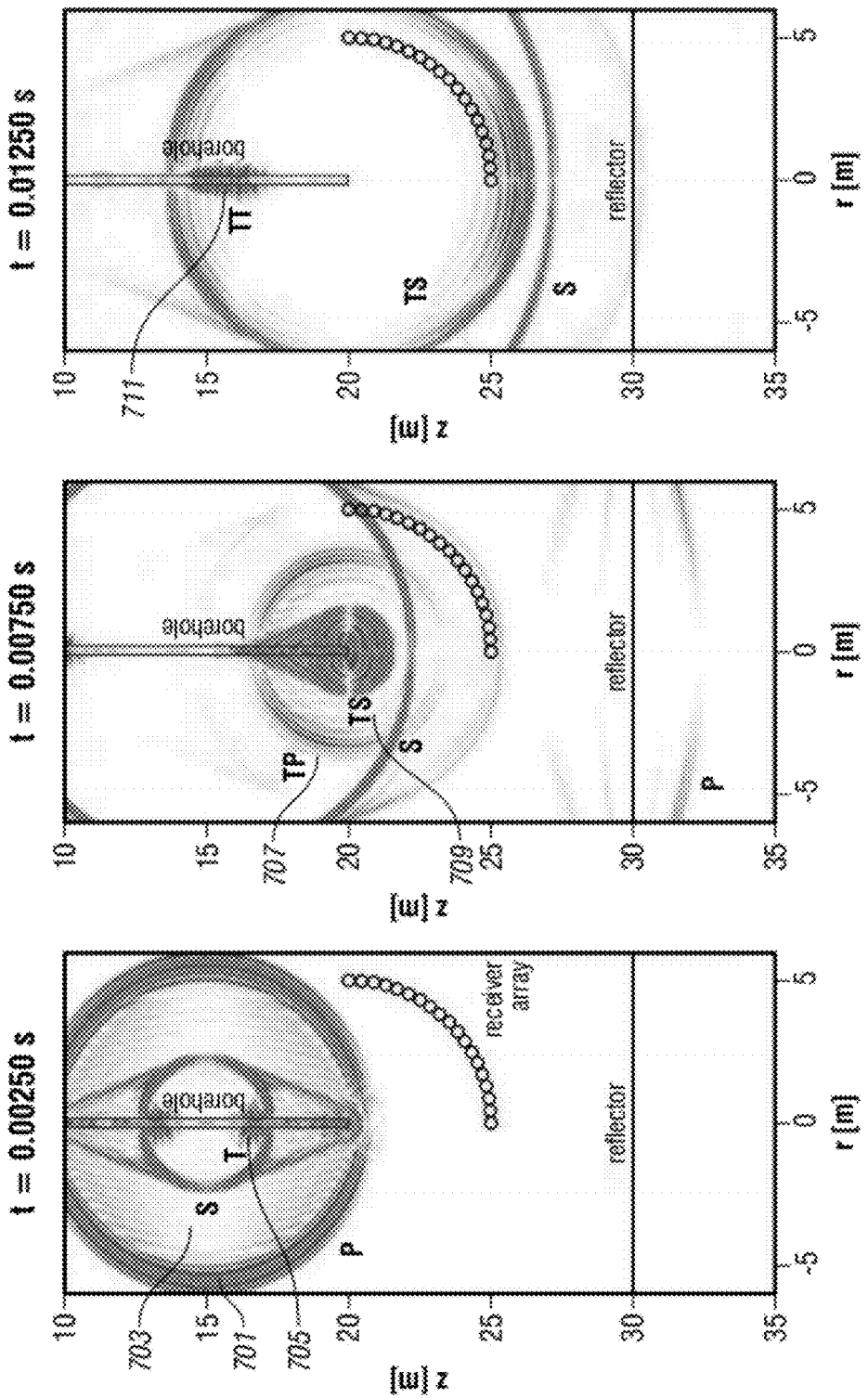

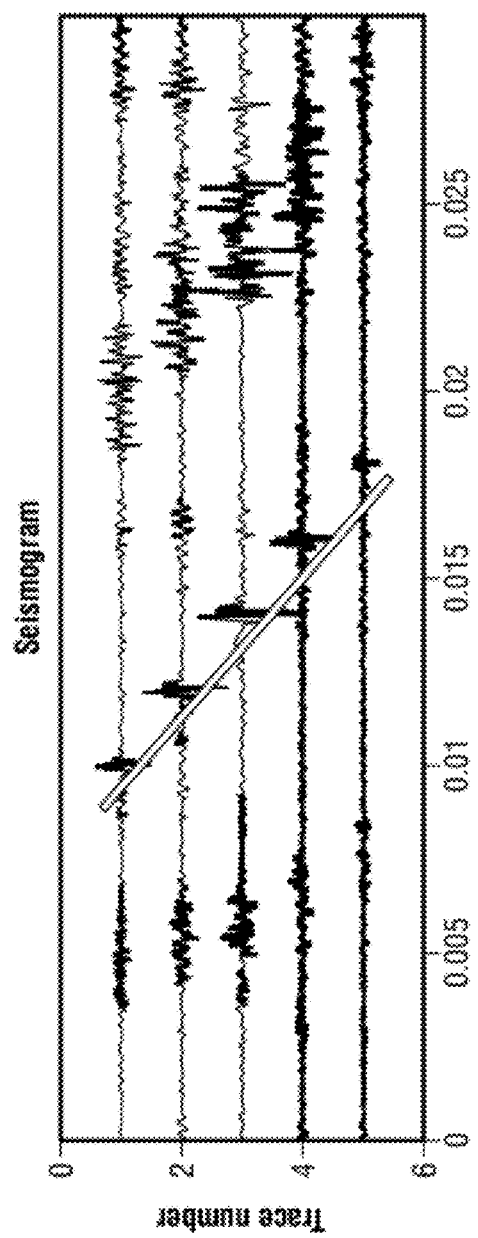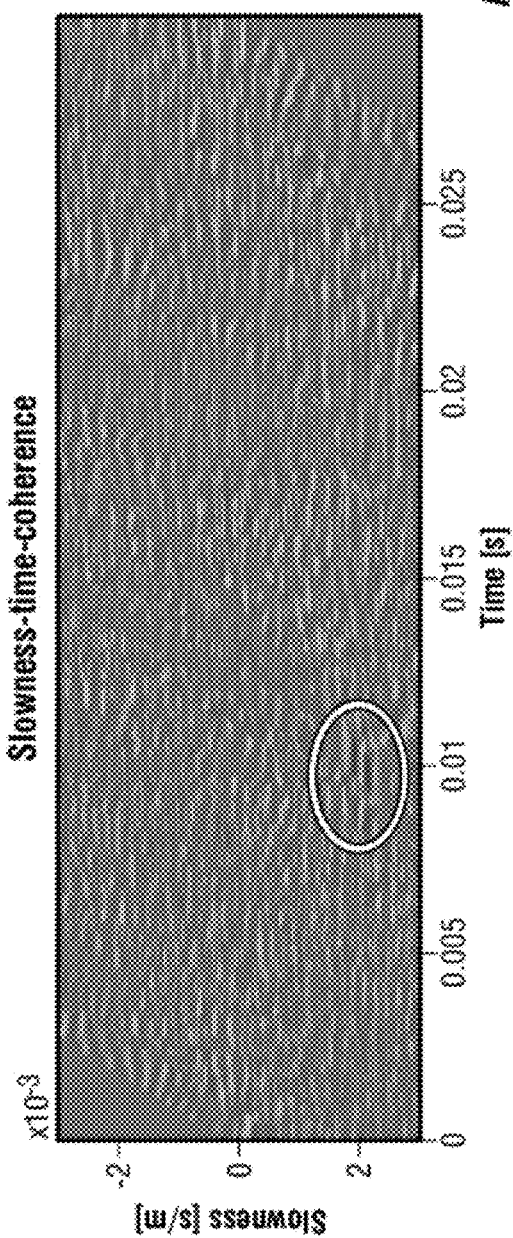

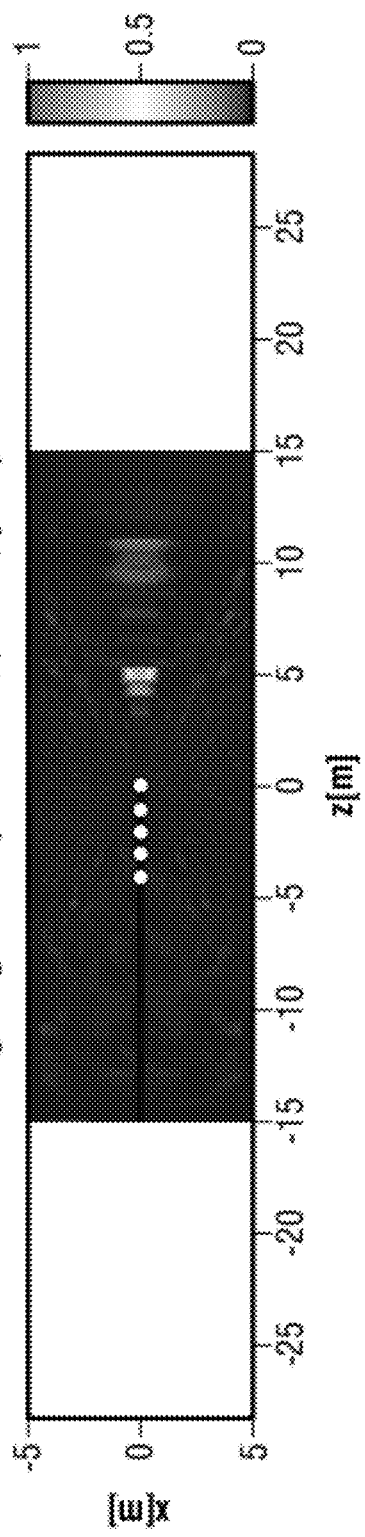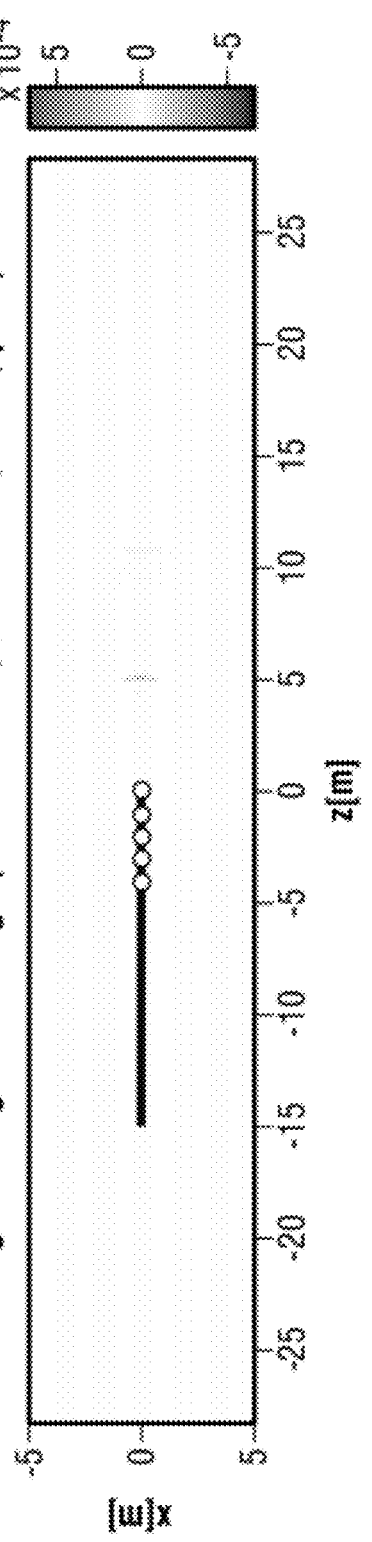

IMAGING OF FORMATION STRUCTURE AHEAD OF THE DRILL-BIT

CROSS-REFERENCES TO RELATED APPLICATIONS

This application claims priority from U.S. provisional patent application Ser. No. 61/376,000 filed on Aug. 23, 2010, incorporated herein by reference in its entirety.

FIELD OF THE DISCLOSURE

The present disclosure pertains to logging while drilling apparatus and more particularly to acoustic logging while drilling apparatus and generating and using guided waves to look ahead of the drill bit.

BACKGROUND OF THE DISCLOSURE

To obtain hydrocarbons such as oil and gas, wells or wellbores are drilled into the ground through hydrocarbon-bearing subsurface formations. Currently, much current drilling activity involves not only vertical wells but also drilling horizontal wells. In drilling, information from the well itself must be obtained. While seismic data has provided information as to the area to drill and approximate depth of a pay zone, the seismic information can be not totally reliable at great depths. To support the data, information is obtained while drilling through logging while drilling or measuring-while-drilling (MWD) devices. Logging-while-drilling (LWD), or MWD are procedures that have been in use for many years. This procedure is preferred by drillers because it can be accomplished without having to stop drilling to log a hole. This is primarily due to the fact that logging an unfinished hole, prior to setting casing if necessary, can lead to washouts, damaging the drilling work that has already been done. This can stall the completion of the well and delay production. Further, this information can be useful while the well is being drilled to make direction changes immediately.

An important part of drilling operations is the trying to control the direction of drilling in a desired direction. This requires the ability to "see ahead" of the drill bit. There is need for a method of processing acoustic data for looking ahead of the drill bit. This disclosure satisfies that need.

SUMMARY OF THE DISCLOSURE

One embodiment of the disclosure is a method of determining a distance to an interface in an earth formation. The method includes: conveying a logging instrument into a borehole; activating at least one transmitter on the logging instrument to produce a guided acoustic wave which propagates downward to the bottom of the borehole and produces an acoustic wave in the earth formation; using at least one receiver on the logging instrument to: receive a first signal responsive to the downward propagating guided acoustic wave, and receive a second signal responsive to an upward propagating guided acoustic wave resulting from reflection of the acoustic wave in the formation at an interface therein; filtering the first signal and the second signal using a dip filter; and estimating from the filtered first signal and the filtered second signal a distance to the interface.

Another embodiment of the disclosure is an apparatus configured to estimate a distance to an interface in an earth formation. The apparatus includes: a logging instrument configured to be conveyed into a borehole; at least one transmitter on the logging instrument configured to produce a guided acoustic wave which propagates downward to the bottom of the borehole and produces an acoustic wave in the earth formation; at least one receiver on the logging instrument configured to: receive a first signal responsive to the downward propagating guided acoustic wave, and receive a second signal responsive to an upward propagating guided acoustic wave resulting from reflection of the acoustic wave at the borehole bottom and in the formation at an interface therein; and at least one processor configured to: filter the first signal and the second signals using a dip filter, and estimate from the first signal and the second signal a distance from the bottom of the borehole to the interface.

Another embodiment of the disclosure is a non-transitory computer-readable medium product having stored thereon instructions that when read by a processor enable the processor to execute a method. The method includes: filtering a first signal and a second signal using a dip filter and estimating a distance from a bottom of a borehole to an interface in an earth formation wherein: the first signal is produced by a receiver on a logging instrument conveyed in a borehole responsive to a downward propagating guided acoustic wave in the borehole; and the second signal is produced by the receiver responsive to an upward propagating guided seismic wave in the borehole, the upward propagating wave resulting from reflection of an acoustic wave produced at the bottom of the borehole by the downward propagating guided acoustic wave and reflected at the interface.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee. For a detailed understanding of the present disclosure, reference should be made to the following detailed description of the embodiments, taken in conjunction with the accompanying drawings, in which like elements have been given like numerals, wherein:

FIG. 2 is an illustration of an exemplary configuration of transmitters and receivers in the present disclosure;

FIG. 3 illustrates schematically the signals that are generated and used according to one embodiment of the present disclosure to see ahead of the drill bit;

FIGS. 6A-6C illustrate the model used to evaluate the method of the present disclosure;

FIGS. 7A-7F illustrates snapshots at selected instants of time of the radial component of particle velocity for the model of FIG. 6;

FIG. 18A shows dip-filtered auto-correlated Common-Receiver-Gather data;

FIG. 18B shows the slowness-time-coherence of the data in FIG. 18A.

FIG. 19C (in color) shows the weighting function obtained from all five traces of the CRG; and FIG. 19D (in color) shows the results of the weighted phase shift migration.

DETAILED DESCRIPTION

Figure 1:
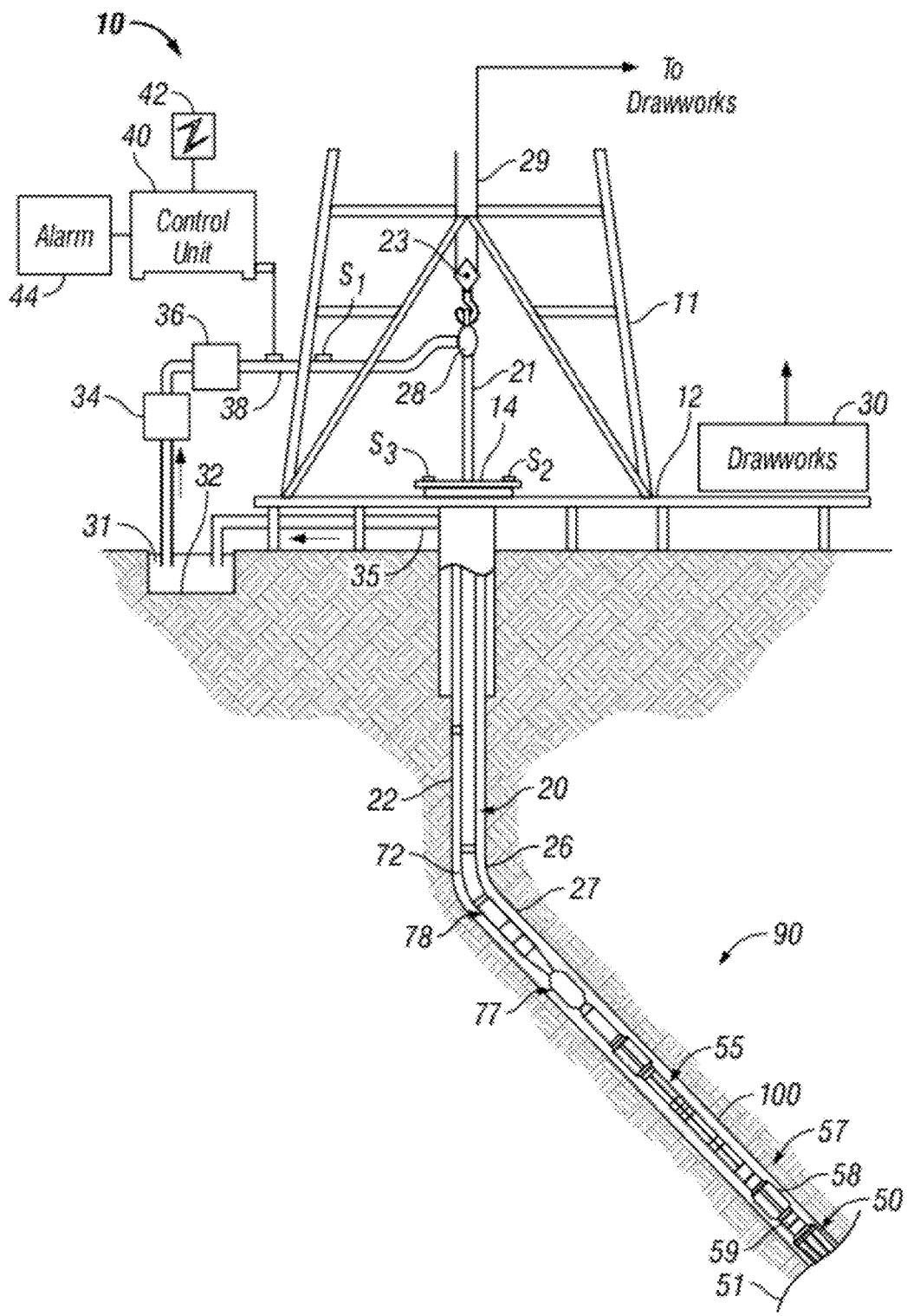
FIG. 1 is an illustration of a bottomhole assembly (BHA) deployed in a borehole from a drilling tubular that includes the apparatus according to one embodiment of the present disclosure.

The present disclosure generally relates to logging while drilling apparatus. More specifically, the present disclosure is related to processing acoustic logging data. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

FIG. 1 illustrates a schematic diagram of an MWD drilling system 10 with a drill string 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the borehole 26. The drill string 20 is pushed into the wellbore 26 when a drill pipe 22 is used as the tubing. For coiled-tubing applications, a tubing injector (not shown) is used to move the tubing from a source thereof, such as a reel (not shown), into the wellbore 26. The drill bit 50 attached to the end of the drill string 20 breaks up the geological formations when it is rotated to drill the borehole 26. If a drill pipe 22 is used, the drill string 20 is coupled to a drawworks 30 via a Kelly joint 21, swivel 28 and line 29 through a pulley 23. During drilling operations, the drawworks 30 is operated to control the weight on bit, a parameter that affects the rate of penetration. The operation of the drawworks is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through openings in the drill bit 50. The drilling fluid 31 circulates uphole through the annular space 27 between the drill string 20 and the borehole 26 and returns to the mud pit 32 via a return line 35. The drilling fluid acts to lubricate the drill bit 50 and to carry borehole cutting or chips away from the drill bit 50. A sensor S1 preferably placed in the line 38 provides information about the fluid flow rate. A surface torque sensor S2 and a sensor S3 associated with the drill string 20 respectively provide information about the torque and rotational speed of the drill string. Additionally, a sensor (not shown) associated with line 29 is used to provide the hook load of the drill string 20.

Rotating the drill pipe 22 rotates the drill bit 50. Also, a downhole motor 55 (mud motor) may be disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit 50. A stabilizer 58 coupled to the bearing assembly 57 acts as a centralizer for the lowermost portion of the mud motor assembly.

A drilling sensor module 59 is placed near the drill bit 50. The drilling sensor module 59 may contain sensors, circuitry, and processing software and algorithms relating to the dynamic drilling parameters. Such parameters may include bit bounce, stick-slip of the drilling assembly, backward rotation, torque, shocks, borehole and annulus pressure, acceleration measurements, and other measurements of the drill bit condition. A suitable telemetry or communication sub 72 using, for example, two-way telemetry, is also provided as illustrated in the drilling assembly 90. The drilling sensor module 59 processes the sensor information and transmits it to the surface control unit 40 via the telemetry system 72.

The communication sub 72, a power unit 78 and an NMR tool (not shown) are all connected in tandem with the drill string 20. Flex subs, for example, are used in connecting the MWD tool 77 in the drilling assembly 90. Such subs and tools form the bottom hole drilling assembly 90 between the drill string 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals may be processed using a downhole processor in the drilling assembly 90.

The surface control unit or processor 40 also receives signals from other downhole sensors and devices, signals from sensors S1-S3 and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. An acoustic logging tool 100 (discussed next) may be positioned at a suitable location such as shown.

Turning now to FIG. 2, an exemplary tool 100 using the method of the present disclosure is illustrated. As would be known to those versed in the art, a downhole acoustic source (or receiver) has a finite length. The source may consist of several segments stacked in the tool axial direction. This may be referred to as a transmitter assembly. In one embodiment of the disclosure, the elements are piezoelectric transducers.

Shown in FIG. 2 are a first array 221a ... 221n of receivers and a second array 261a ... 261n of receivers symmetrically disposed about an array 241a ... 241n of transmitters. The arrays may include elements that are axially and/or circumferentially disposed. While the illustration shows them on a single housing, this is not to be construed as a limitation to the disclosure; a common configuration uses transmitters and receivers on more than one sub. Also shown in the figure is the borehole 26, the drill bit 50 and a reflector 211. The reflector 211 corresponds to an interface where there is a change in impedance of the formation 200, so that incident waves would be reflected back.

A novel feature of the present disclosure is the fact that it takes advantage of guided waves generated by an acoustic transducer in a borehole. The following terms are defined for the purposes of this disclosure. A guided wave is any type of wave that is propagated along a borehole that involves coupled motion of the fluid in the borehole, the tool and the borehole wall. A Stoneley wave is a particular type of guided wave, characterized by an omni-directional directivity pattern.

In the present disclosure, each source element may be tuned in a way to reach maximum output at a specific center frequency to maximize the generation of these guided waves. If such a tuning is not feasible, different source modules with different center-frequencies could be deployed. If more than one source is used, the distance between sources is directly related to the applied frequencies (orders of wavelengths) so interference and beam steering becomes feasible. A coupling of all/some source elements directly to the formation 200 by means of pad devices or similar is optional. Source elements could be piezoelectric, piezoceramic, magnetostrictive, or other impulsive or swept frequency devices.

This variety of source center-frequencies and locations enables the generation of a maximal amount of guided wave energy in monopole, dipole, quadrupole or higher order excitations. To be specific, Stoneley waves may be generated by monopole excitation. Quadrupole excitation, as described in U.S. Pat. No. 6,850,168 to Tang et al., may produce a guided wave that involves coupled formation and fluid motion that travels at close to the shear velocity of the formation.

Having multiple sources axially distributed in the drillstring enables the performance of a multi-offset measurement (variable source-receiver and source-reflector distance) in one run. With only one source in the drillstring this could be achieved by repetitive measurements while drilling ahead only. Mapping the same reflector with changing source-reflector distances as well as having varying source-receiver offsets is beneficial for a proper data evaluation.

Each receiver 221a ... 221n, 261a ... 261n is tuned to meet the characteristics of the used source. In case different source modules are used, different receiver modules (with receiving characteristics matching the respective source characteristics) need to be applied as well. The spatial arrangement (circumferential and axial) of the receivers is influenced by the maximum source frequency and the excitation mode. For lower frequencies different sensor elements might be connected in parallel. Sensor elements could be pressure or motion sensitive devices mounted directly in the BHA or coupled to the formation via pads or similar systems. Different types of sensors and mountings might be applied in parallel to serve various excitation modes simultaneously in one BHA.

Turning now to FIG. 3, the basic principle of the present disclosure is illustrated. Activation of a transmitter such as 300 excites a variety of waves in the borehole, the formation and the interface between the borehole and the formation. It is common knowledge that in most instances, the strongest borehole guided wave generated by monopole excitation is a Stoneley wave. The generated Stoneley wave is depicted in FIG. 3 by 301. This guided wave propagates along the borehole. This so-called "direct" guided wave is recorded by receivers such as 311 and used for further processing discussed below. The use of Stoneley waves is not to be construed as a limitation to the disclosure. Generally, a guided wave will be produced by any type of excitation.

It should be noted that the drill bit 50 does not block the borehole 26 completely, so that much of the direct guided wave does reach the bottom 51 of the borehole. When the guided wave reaches the bottom 51 of the borehole, some of it is reflected back. A significant portion of the guided wave is transmitted into the formation 200. This is denoted by 303 in the figure.

The downgoing energy 303 is reflected by an interface such as 211, and the reflected energy 305 re-enters the borehole. Upon re-entry into the borehole, much of it is converted back into a guided wave (denoted by 307) and propagates up the borehole. All modes are excited at borehole re-entry time. This reflected guided wave is also measured by receivers such as 311. The measurements of the direct and reflected guided waves form the basis for imaging ahead of the drill bit 50. With a multipole receiver array, a desired mode can be obtained through azimuth stacking.

Figure 4:
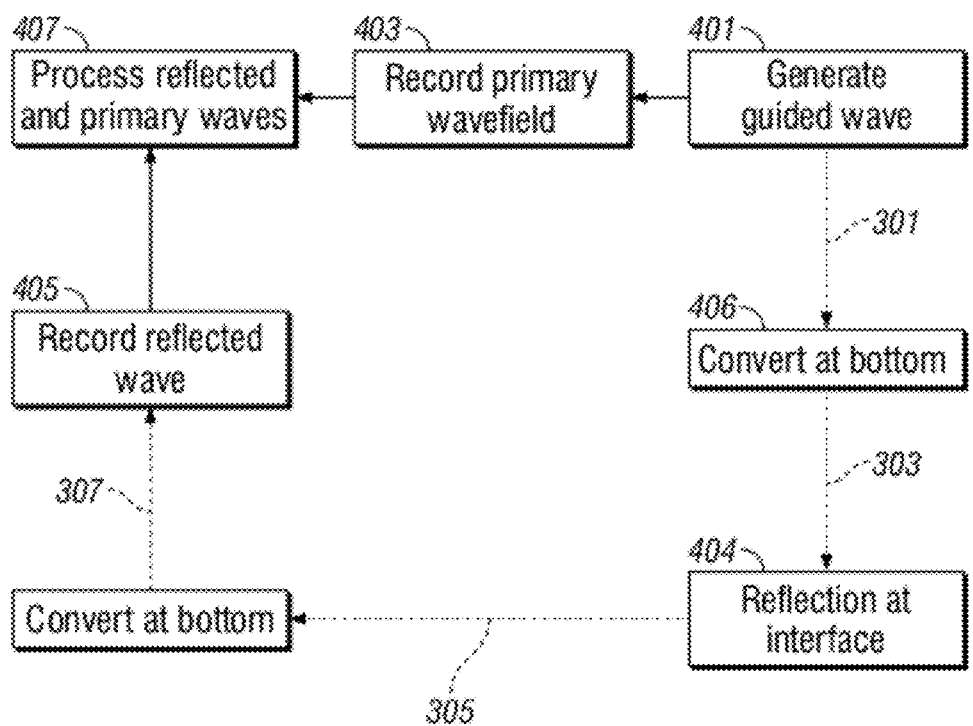
FIG. 4 is a flow chart illustrating some of the methods and physical processes according to one embodiment of the present disclosure.

Turning now to FIG. 4, a hybrid flow chart is shown that illustrates the processing steps and the physical processes involved. A guided wave is generated 401 by activating at least one transmitter on the logging tool, and the primary wavefield 301 is recorded 403 by at least one receiver in the receiver array. This may be referred to as a "first signal." At the bottom 406 of the borehole, the primary wavefield 301 is partially transmitted 303 as an acoustic wave in the formation, reflected 404 at the interface to produce the reflected wavefield 305 in the formation. The reflected wavefield in the formation is converted at the bottom 406 of the wellbore to produce an infinite number of guided wave modes 307 in the borehole that is indicative of the reflecting interface. The reflected guided waves are recorded by the receivers in step 405. This may be referred to as a "second signal." The recorded reflected guided waves from step 405 may be processed with the recorded primary wavefield of step 403 in step 407. Also shown in FIG. 3 is a reflection 313 of the primary wavefield at the bottom of the borehole.

Those versed in the art and having benefit of the present disclosure would recognize that since the receiver arrays record both the downgoing guided wave and the upcoming guided wave, conventional wavefield separation methods can be used to separate the guided waves on the basis of the direction of propagation. See, for example, *Blias*, (2005) SEG Extended Abstracts.

The feasibility of the method is studied by means of numerical FD-models. Modeling is performed using the 2.5D FDTD software FDBH by T. Bohlen and O. Hellwig. It is based on a velocity-stress-formulation of the elastic wave equation in cylindrical coordinates with radius r and depth z as spatial model variables. Although the model is assumed to be constant with azimuth θ, the code does not only allow to model rotation-symmetric wave fields excited by monopole sources, but also wave fields of higher order n with a cos(nθ)- and sin(nθ)-dependance, such as dipole (n=1) or quadrupole (n=2) wave fields.

The model comprises a cylindrical fluid-filled borehole with drilling tool in a homogeneous formation. The drilling tool divides the borehole into a central fluid cylinder and a fluid annulus. 10 m ahead of the borehole bottom, perpendicular to the borehole axis, there is a plane reflector. The presented data example contains a dipole volume injection source, which is located within the fluid annulus of the borehole. As source signal, a Ricker wavelet with a center frequency of 5000 Hz is used. The model geometry is given in FIG. 6.

Figure 5:
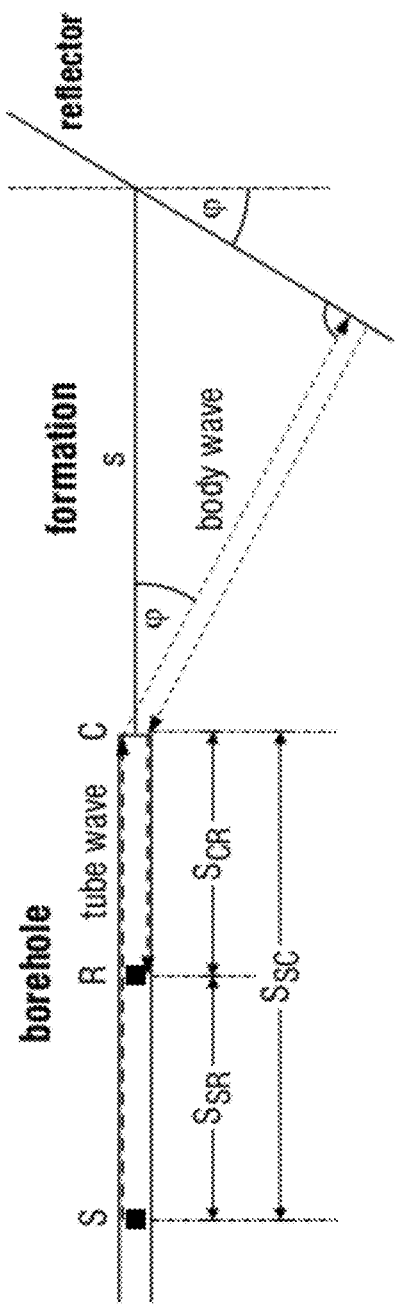
FIG. 5 illustrates the travel paths of the different types of waves involved in one embodiment of the present disclosure.

FIG. 5 illustrates the travel paths of the involved wave types from the source (S) to the receiver (R) and their conversion at the conversion point (C). An advantage of using borehole guided waves is that they are less attenuated by geometrical spreading than body waves. FIG. 5 includes the possibility of the reflector (211 in FIG. 3) being inclined at an angle φ to the tool axis.

Figure 7F:
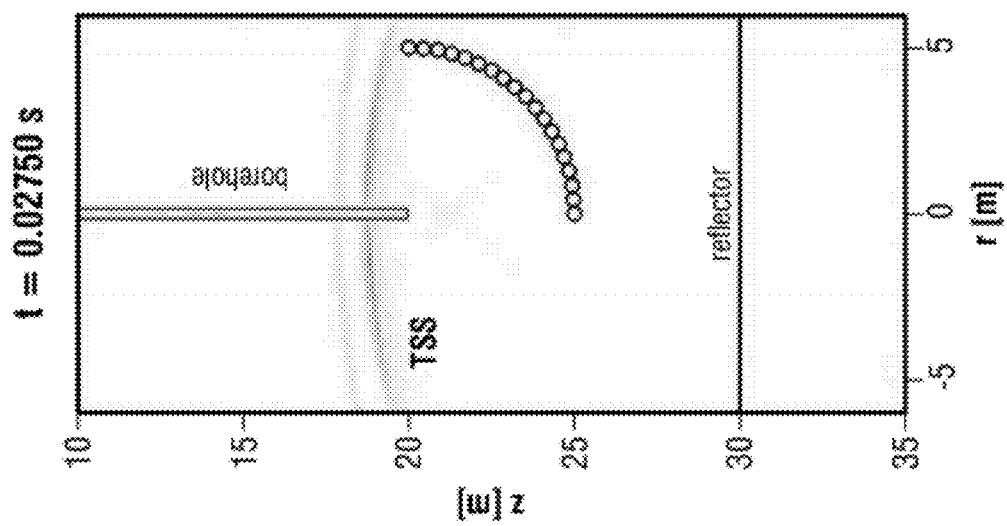
Figure 7E:
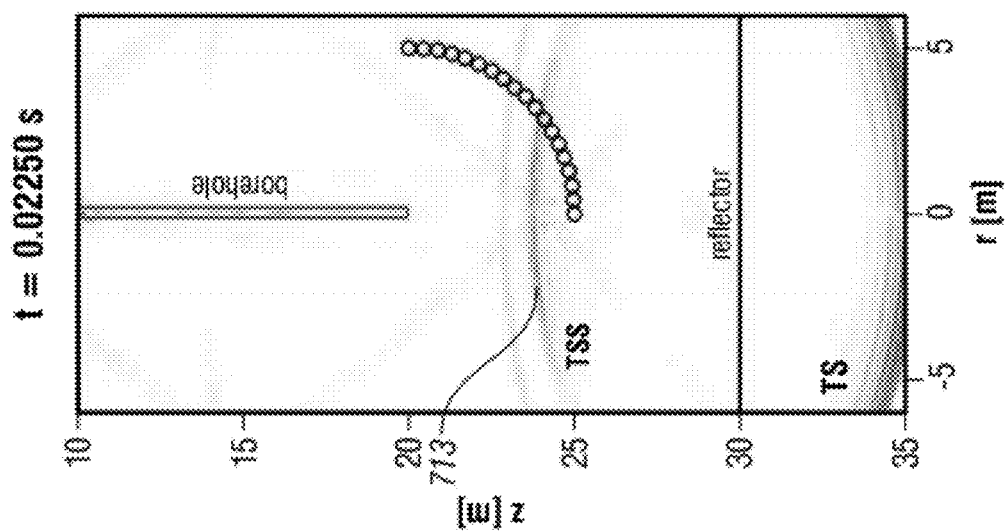
Figure 7D:
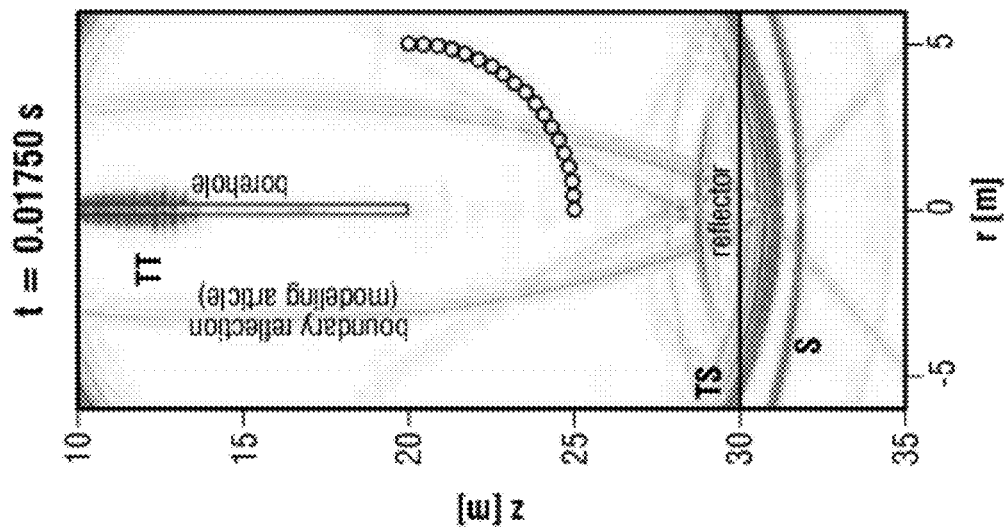

FIG. 7 shows snapshots at different instances of time (2.5 ms, 7.5 ms, 12.5 ms, 17.5 ms, 22.5 ms, and 27.5 ms) of the radial component (r-component) of the particle velocity. These snapshots show the propagation of different wave types excited by the model source (P: direct P-wave 701; S: direct S-wave 703; T: flexural wave (borehole guided wave excited by a dipole source) 705; TP: flexural wave converted into a P-wave 707; TS: flexural wave converted into a S-wave 709; TT: flexural wave reflected at borehole bottom 711; TSS: TS-wave reflected at a layer boundary 713; TSST: TSS-wave converted into a flexural wave; boundary reflection: modeling artifact, reflection of waves at the model boundary). Note the reflected TSS-wave is clearly visible at 22.5 ms and just visible at 17.5 ms.

Figure 10:
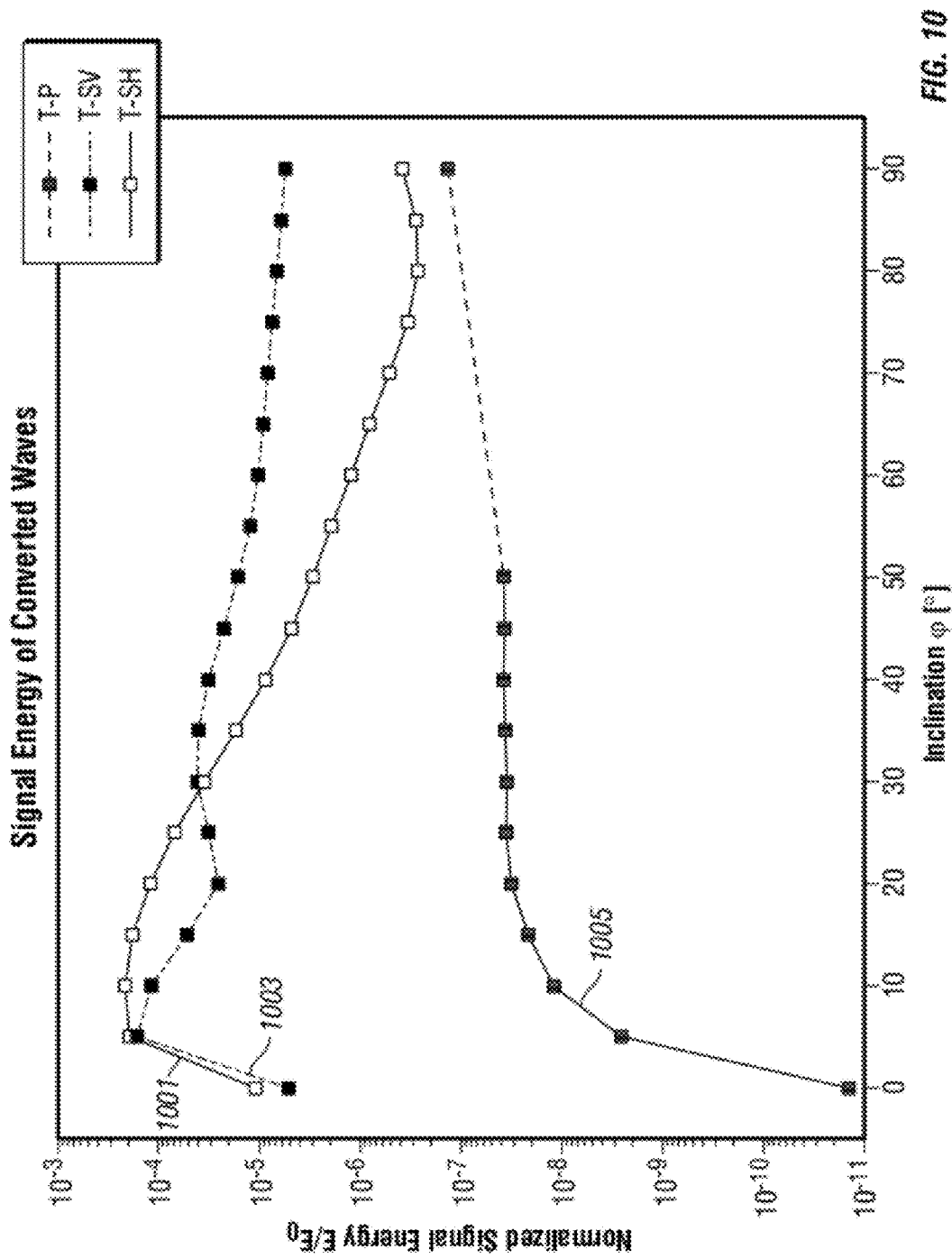
FIG. 10 shows the signal energy of converted waves.

The snapshots make clear that the main portion of the flexural wave (T) is converted into S-waves (TS) at the borehole bottom. The conversion characteristic is studied in detail at the receiver positions indicated in FIG. 10. The result is summarized in FIG. 10, which shows the signal energy $$\int_{t_1}^{t_2} \dot{u}^2 \, dt$$

of converted waves 5 m away from the conversion point and normalized by the signal energy of the flexural wave at one receiver position within the fluid annulus before conversion. The given values of T-P- and T-SV-conversion apply to an azimuth of θ=0°, whereas the values of T-SH-conversion apply to θ=90° due to the mentioned cos(nθ)- and sin(nθ)-dependance of the corresponding wave field components. SV refers to vertically polarized S-waves and SH refers to horizontally polarized S-waves. FIG. 10 confirms that T-wave to S-wave conversion 1001, 1003 seems to be much more efficient than T-wave to P-wave conversion 1005. The signal energy of both converted wave types differ by orders of magnitude. For this reason, only TSST-waves are considered regarding ahead of drill exploration.

Figure 11:
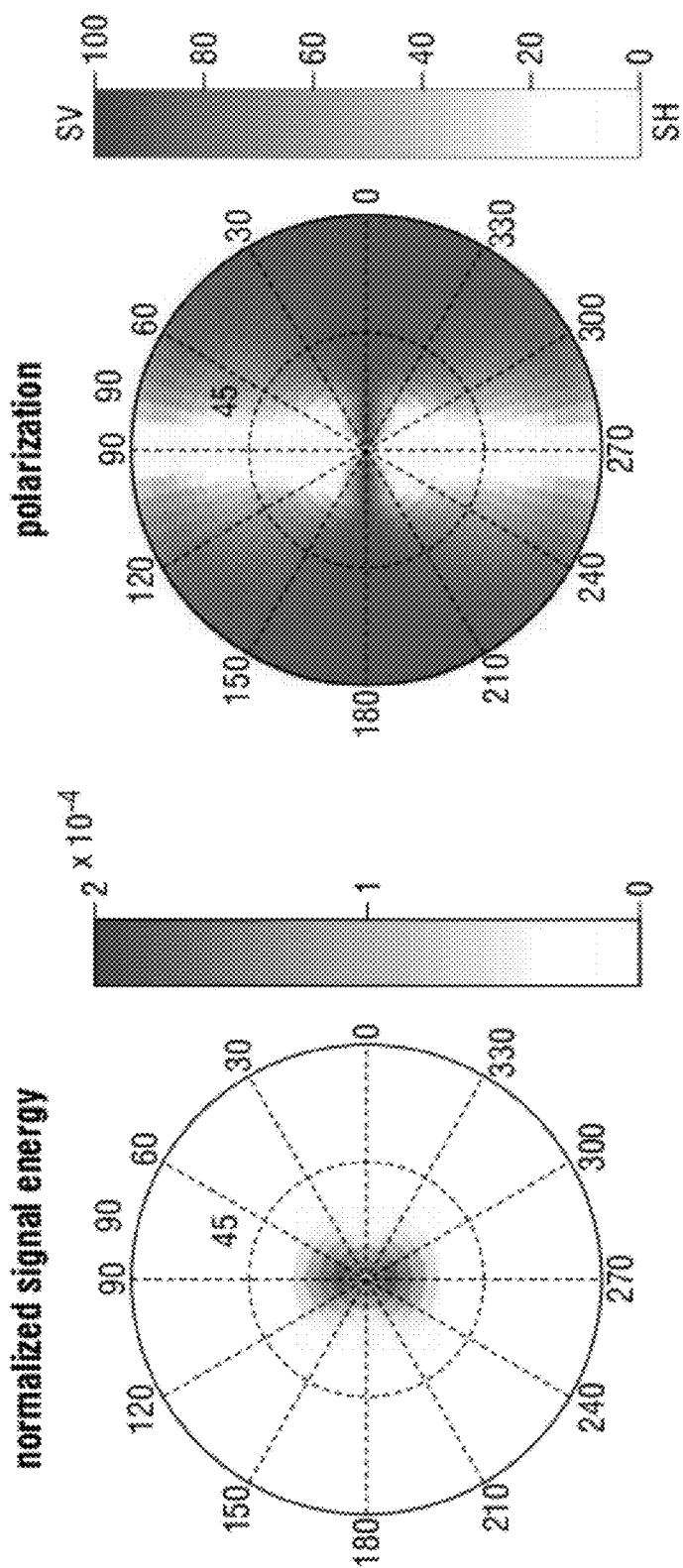
FIG. 11 shows the normalized azimuthal energy of T-S converted waves.

If the azimuthal dependence of T-SV- and T-SH-conversion is taken into account in addition, the directivity of T-S-conversion is obtained as displayed in FIG. 11. It shows the normalized signal energy of T-S-converted waves dependent on their direction of radiation. The middle of the plot corresponds to the direction along the borehole axis) (φ=0°. The edge corresponds to the direction perpendicular to the borehole axis) (φ=90°, and the circumferential direction corresponds to the azimuth angle θ. The figure shows that the main portion of this converted wave type is radiated at an interval between φ=5° and φ=30°. This angle range depends on the elastic parameters of the formation as well as on the geometry of the borehole and the drill bit in particular. Furthermore, it is evident that the type of the borehole guided wave excited in the borehole and its frequency have an influence on the directivity of the converted waves. If the formation parameters are known, it is possible to direct S-waves from the conversion point (drill bit) in a desired direction by adjusting the source parameters (frequency range, source order), thus targeting at reflectors with a characteristic alignment relative to the borehole.

Figure 8A:
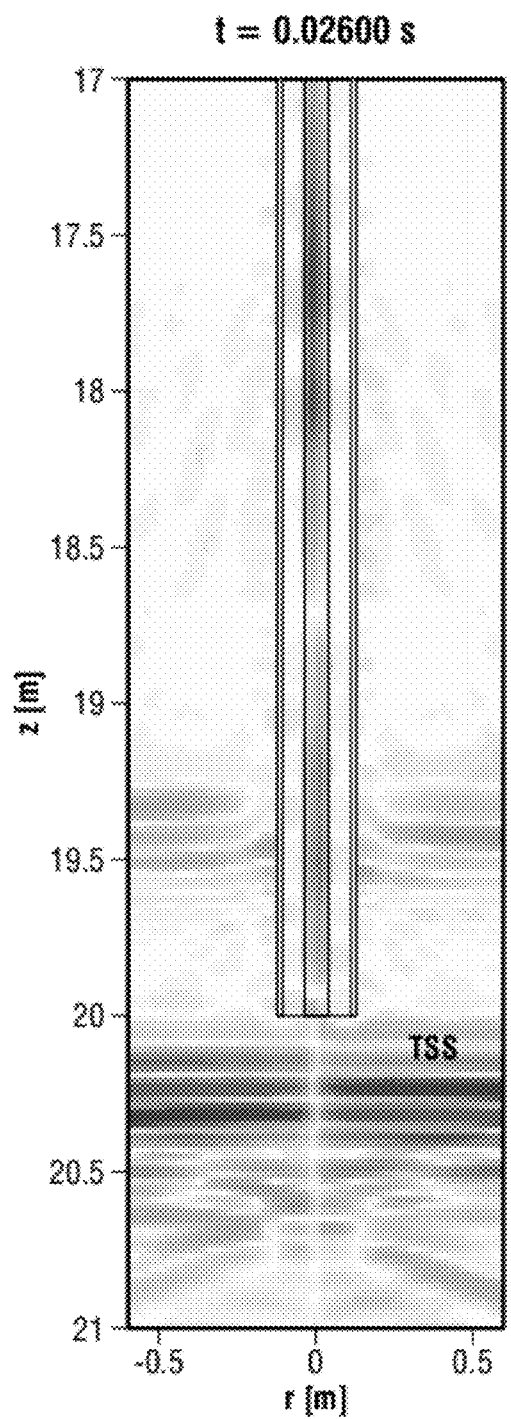
FIG. 8A-8B shows snapshots of the wave field (r-component of particle velocity): Conversion of an S-wave (TSS) into a borehole guided wave (TSST)
Figure 8B:
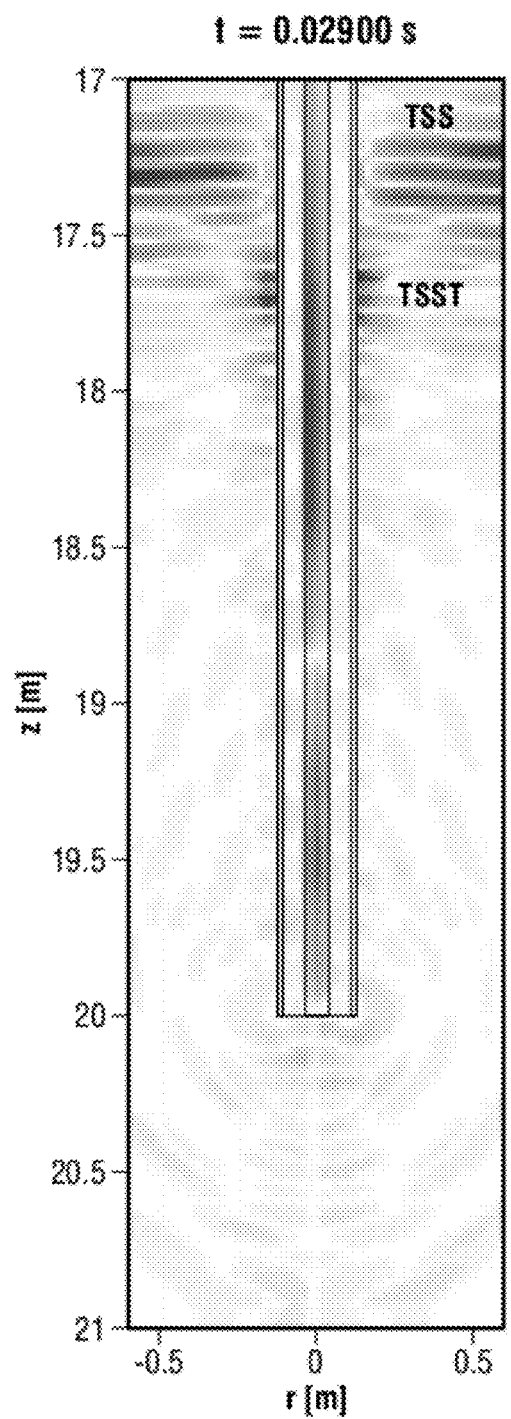
Figure 9:
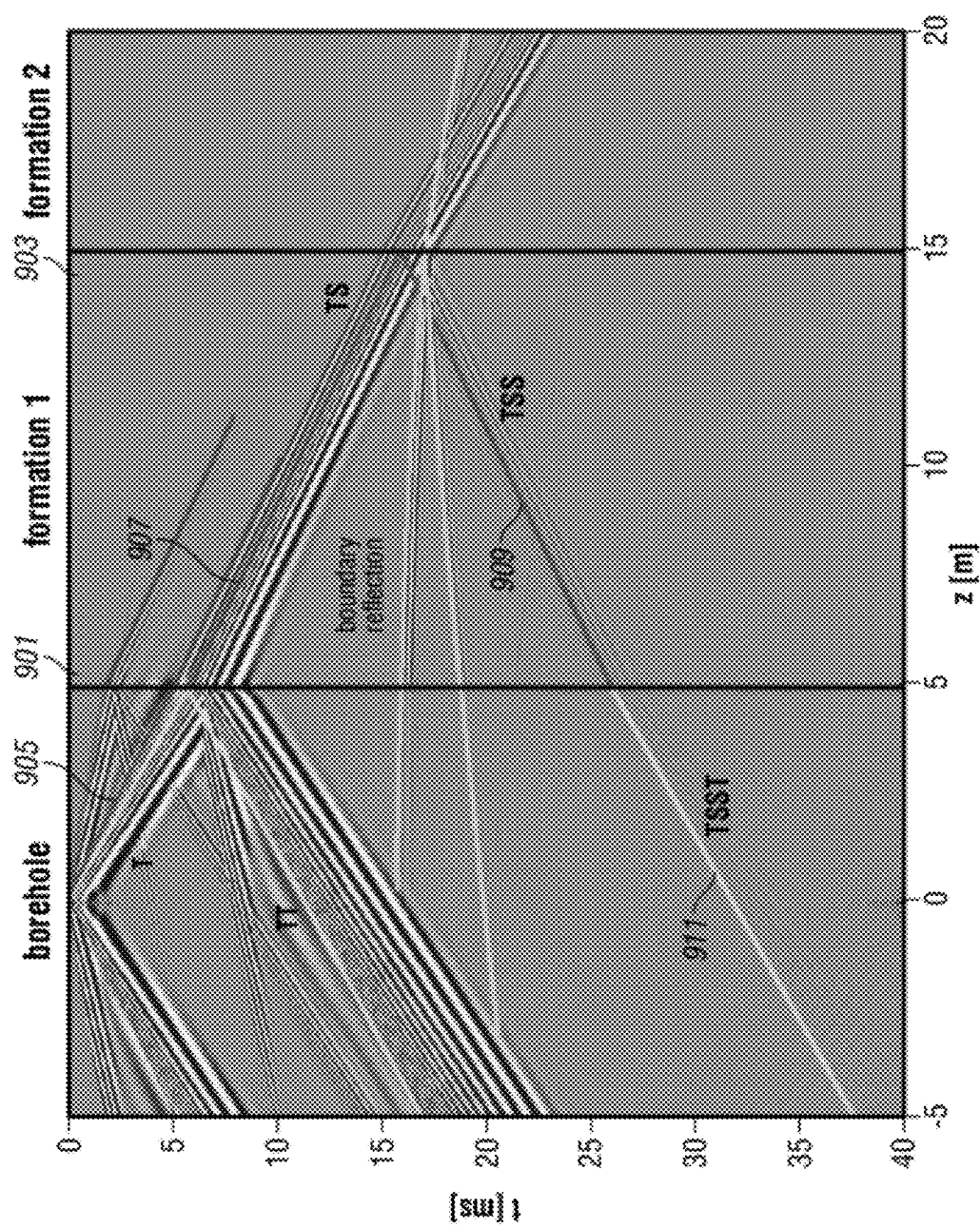
FIG. 9 shows a modeled seismogram (r-component of particle velocity displayed) covering receivers along the borehole and ahead of it with a dipole source, 5000 Hz: Conversion of a flexural wave (T) into a S-wave (TS) at the borehole bottom z=5 m; reflection of the S-wave at a layer interface z=15 conversion of the reflected S-wave (TSS) into a flexural wave (TSST) at the borehole bottom.

The modeled seismogram (FIG. 9) shows the wave field (r-component of particle velocity) along the borehole at r=0.11 m (fluid annulus) and ahead of the borehole within two different types of formation. The line 901 marks the conversion point at the borehole bottom z=5 m and the line 903 marks the layer interface (reflector at z=15 m). Starting at the source position (z=0 m) and t=0 ms, the flexural wave (T), 905 propagates towards the borehole bottom at z=5 m. Although flexural wave to S-wave conversion exhibits a minimum into the direction of the borehole axis (φ=0'; see FIG. 10), conversion into an S-wave (TS), which is indicated by 907, can be observed. Arriving at the reflector at z=15 m, a portion of it is reflected and travels back towards the borehole bottom (TSS) 909. There it excites a flexural wave (TSST) again 911. This can be seen comparing the two snapshots of the wave field (r-component of particle velocity) in FIG. 8. The TSS-wave is approaching at the borehole bottom and continues to travel along the borehole. The excited flexural wave (TSST) is separated from the TSS-wave and guided by the borehole. It propagates at a slightly slower velocity than the S-wave (TSS). Thus it falls back behind the TSS-wave.

At each measurement level the recorded data are evaluated within the model environment. The evaluation comprises the separation of the primary and the secondary wavefield, the construction of a wellbore velocity model and an ahead-of-the-bit velocity model, as well as the resorting and preconditioning of the data (e.g. filtering). It should be noted that the conversion to an acoustic wave propagating in the formation is not limited to propagation directions directly ahead of the borehole. Consequently, with the use of a transmitter and/or receiver array, there is sufficient aperture to "image" the reflector to determine the reflectors position and dip. The imaging procedure could be any method rearranging the acoustic information elements in a way that reflections and diffractions are plotted on their true locations (e.g. an inversion operation as time or depth migration).

The data evaluation results are used to optimize the source and receiver settings of the next measurement sequence or level (closed loop feedback). Depending on the telemetry bandwidth from downhole to surface, the data evaluation and the closed loop feedback could be performed on the surface or downhole by means of autonomous inversion schemes (this might involve the downhole implementation of artificial intelligence and/or neural networks). The determined boundary location may be used to control the direction of drilling (reservoir navigation). The term "reservoir navigation" includes controlling the direction of drilling to stay at a predetermined distance from a bed boundary and/or to stay at a predetermined distance from a fluid interface that gives rise to the reflection.

Figure 14:
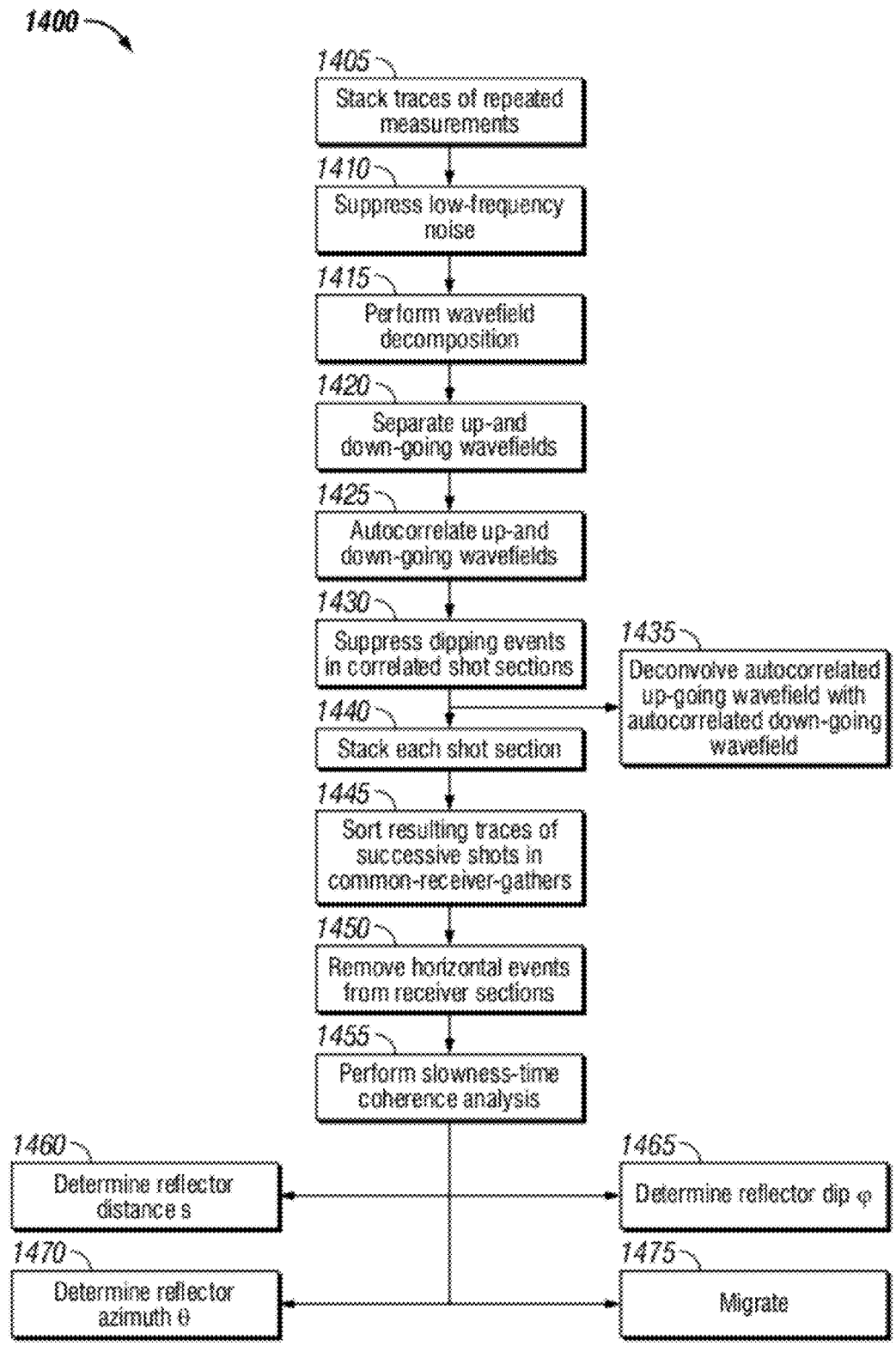
FIG. 14 is a flow chart of a method for processing data according to one embodiment of the present disclosure.

FIG. 14 shows an exemplary method 1400 for processing acoustic data to obtain a scattered wavefield according to one embodiment of the present disclosure. In step 1405, the traces (such as in FIGS. 9 & 12) of repeated measurements may be stacked. The stacking may be performed to suppress random noise. In step 1410, low frequency noise (such as from the drill bit) may be suppressed using frequency filtering (high-pass). In step 1415, the wavefield is decomposed into separate wave modes (monopole, dipole, etc.). In step 1420, up-going and down-going waves inside the borehole may be separated. Separation may use a variety of techniques, including, but not limited to, at least one of: (i) single trace processing and (ii) dip-filtering. In step 1425, up-going and down-going wavefields may be autocorrelated. Autocorrelation may be used to correct for dispersion and travel time reduction. In step 1430, dipping events may be suppressed in the correlated shot sections using dip filtering (such as median filtering). In step 1435, the autocorrelated up-going wavefield may be deconvolved with the autocorrelated down-going wavefield. In some embodiments, step 1435 may not be performed or may be performed after step 1440. In step 1440, each shot section may be stacked. In step 1445, resulting traces from successive shots may be sorted in Common-Receiver-Gathers (CRG). In step 1450, horizontal events may be removed from the receiver sections by dip filtering (such as median filtering). In step 1455, slowness-time-coherence analysis is performed. This analysis may be used to determine arrival time $t_{ss}$ and apparent slowness $p_a$ of dipping events in the receiver section. In step 1460, reflector distance s may be determined. In step 1465, reflector dip $\phi$ may be determined. Step 1465 may require additional information regarding the S-wave velocity, $v_s$, of the formation. In step 1470, the reflector azimuth $\theta$ may be determined. Alternatively, it may be possible to use the filtered CRG data as input for a migration algorithm 1475 that is especially suited for imaging structures ahead of the drill bit with a minimum number of downhole receivers.

Some embodiments of the present disclosure may use synthetic data, real data, or some combination thereof. Synthetic data may only contain the dipole portion of a wavefield due to the axial symmetry of the model used. Real data may show contributions of other multipole orders in addition to the dipole portion since the axial symmetry is only a rough approximation of real borehole conditions. Real data may also include random and coherent noise, often caused by the drill bit and fluid flow in and around the drill string.

Elaborating on the steps of method 1400, in step 1410 drill bit noise may be filtered using a high-pass filter with a cut-off frequency below the frequency band of the active source and above the frequency maximum of the noise may attenuate these unwanted signals. In some embodiments, seismic waves generated by the drill bit may be used for prediction ahead of the bit.

In step 1420, the up-going wavefield at a receiver position may contain reflections originating from the drill string, from the drill bit, and from ahead of the bit caused below the receiver position, however, the down-going wavefield may contain reflections caused above the receiver position. Seismic prediction ahead of boreholes may focus on reflectors ahead of the drill bit. If the total wave field is used for imaging, it is very likely that reflections from above the receiver level, where the borehole intersects layer boundaries, cover TSST-signals from ahead of the drill bit and cannot be distinguished from them after correlation. Wavefield separation may be used as a tool to suppress unwanted reflections and to enhance reflections contained in the up-going wave field originating from below the receiver position. If wave field separation yields good results, the down-going wavefield can be used in a later processing step for deconvolution. The separation of up- and down-going waves may be implemented in several ways, including, but not limited to, at least one of: (i) using the pressure field and the vertical particle velocity recorded by dual sensors, which may be performed trace by trace, and (ii) using dip filters. Wavefield separation may not be performed when only synthetic data is used.

Figure 12A:
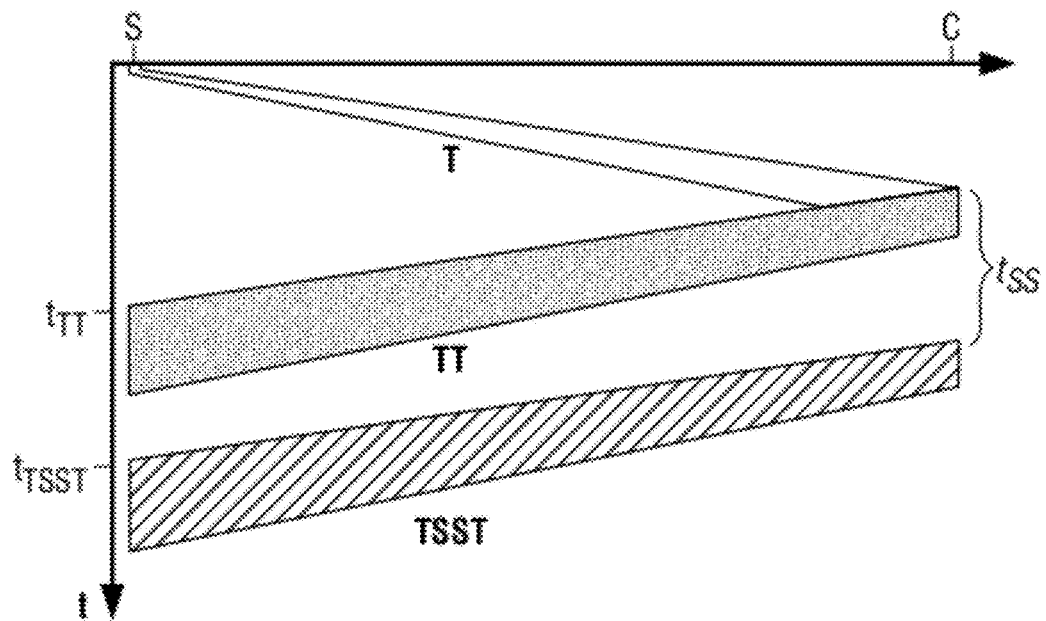
FIG. 12A shows seismograms with traces recorded between source position (S) and conversion point (C) before performing dispersion correction and travel time reduction: the TSST-wave is imaged at the travel time $t_{SS}$, which corresponds to the distance between conversion point and reflector.
Figure 12B:
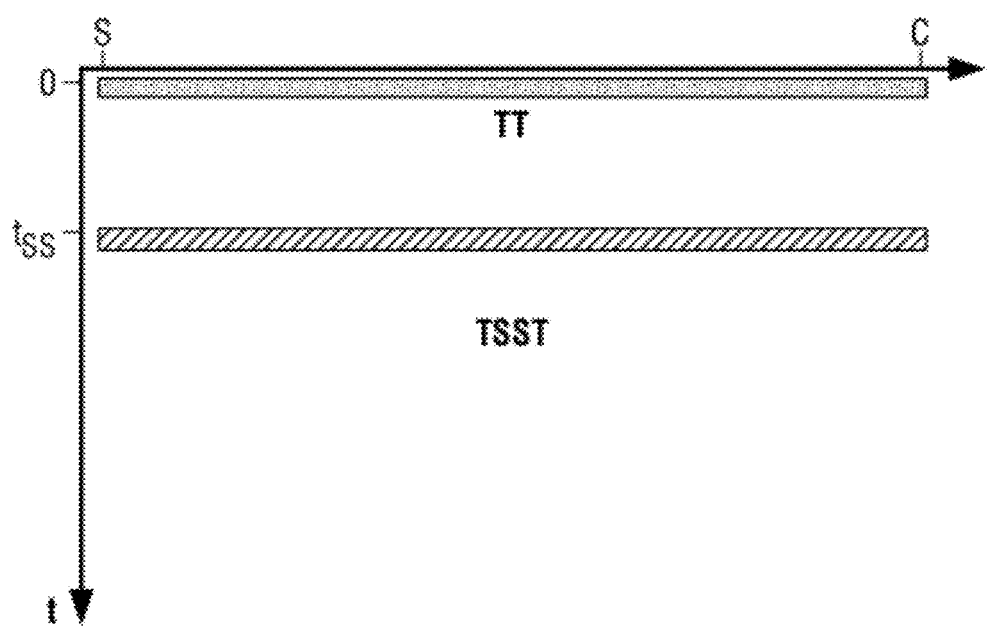
FIG. 12B shows seismograms after performing dispersion correction.

To determine the distance of reflectors ahead of the drill, the travel time $t_{TSST}$ of TSST-waves has to be reduced to the travel time $t_{SS}$ of S-waves between the conversion point (borehole bottom) and the reflector. Furthermore, it has to be taken into account that the borehole guided wave (T and TSST) is characterized by dispersion. The signal is stretched and the amplitude of the signal decreases during propagation. The aim is to shift the recorded TSST-signal to the travel time $t_{SS}$ and to reduce the effect of dispersion as sketched in FIGS. 12a-12b. FIG. 12a shows a schematic seismogram section corresponding to receivers between source position (S) and conversion point (C) along the borehole. As shown in FIG. 12b, the borehole guided wave which is reflected at the borehole bottom (TT) has to be shifted to t=0 ms, and the TSST-signal to $t_{SS}$.

In step 1425, the autocorrelation function may exhibit a local maximum at the time shift between similar signal sequences of a seismic trace. The global maximum may be found at zero time-lag. The amplitude at zero time-lag is equal to the total trace energy (sum of all squared samples of the trace). The direct borehole guided wave (T) travelling down the borehole may be reflected at the drill bit (TT). Another part of this wave may be converted into body waves (mainly S-waves) and radiated into the formation around the drill bit (TS). Assuming that the converted borehole guided wave (TS) is reflected at an interface ahead of the bit (TSS) and couples back to the borehole as the same wave mode (TSST) like the TT-wave, both the TT- and the TSST-wave have the same dispersion characteristics due to the same travel path inside the borehole. This holds true for a perfectly axially symmetric borehole and a plane reflector aligned perpendicular to the borehole axis. If there is a deviation from axial symmetry and if the reflector has a noticeable dip, the back conversion may be more complicated, and borehole guided waves not only of a single order (e.g. monopole, dipole or quadrupole) but of different orders may be involved.

The TSST-wave is more or less a time-shifted TT-wave with respect to the wave mode that is excited by the source. Although TT- and TSST-wave have different amplitudes, both are characterized by the same dispersion pattern. The difference in travel time between the TT- and TSST-wave corresponds to the two-way travel time between drill bit and reflector. Hence, the autocorrelation of a trace containing TT- and TSST-signals yields a local maximum at this time shift. Furthermore, autocorrelation may correct the dispersive character of the waves as can be seen in the following equations:

$$A_{TT}(z, \omega) = A_1 S(\omega) \exp\left(-i\omega \frac{z}{v(\omega)}\right)$$

$$A_{TSST}(z, \omega) = A_2 S(\omega) \exp\left(-i\omega \frac{z}{v(\omega)}\right) \exp(-i\omega t_{SS})$$

$$A(z, \omega) = A_{TT}(z, \omega) + A_{TSST}(z, \omega)$$

where $A_{TT}$ denotes the borehole guided wave that is directly reflected at the drill bit with its amplitude $A_1$ and $A_{TSST}$ is the TSST-wave with the amplitude $A_2$. $S(\omega)$ is the normalized source spectrum, z is the total travel path within the borehole and $v(\omega)$ is the frequency dependent speed of wave propagation in the borehole. $t_{SS}$ is the time shift between TT- and TSST-wave. In the frequency domain the autocorrelation of a trace including these terms may follow as:

$$\begin{aligned}ACF_A(\tau) &= \int_{-\infty}^{\infty} A(z, \omega) \cdot A^*(z, \omega) \exp(i\omega\tau) d\omega \\ &= \int_{-\infty}^{\infty} |S(\omega)|^2 [A_1 + A_2 \exp(-i\omega t_{SS})] \\ &\quad [A_1 + A_2 \exp(-i\omega t_{SS})] \exp(i\omega\tau) d\omega \\ &= \int_{-\infty}^{\infty} |S(\omega)|^2 [(A_1^2 + A_2^2) + A_1 A_2 (\exp(-i\omega t_{SS}) + \\ &\quad \exp(i\omega t_{SS}))] \exp(i\omega\tau) d\omega \\ &= [(A_1^2 + A_2^2)\delta_{\tau=0} + A_1 A_2 (\delta_{\tau=-t_{SS}} + \delta_{\tau=-t_{SS}})] * \\ &\quad \int_{-\infty}^{\infty} |S(\omega)|^2 \exp(i\omega\tau) d\omega\end{aligned}$$

where * denotes convolution. It is easy to see that the exponential terms representing the dispersive character of the waves disappear. In addition to the global maximum at τ=0 the other maxima appear exactly at the time-lag between TT- and TSST-wave $\tau=\tau_{SS}$. The remaining integral may be the autocorrelation of the source signature $S(\omega)$. An ideal source signal may be an infinitely short impulse (white spectrum), however, this may not be feasible in some cases. It may be desirable to use a source signal with maximum band width (e.g., impulse or sweep) so that the integral related to the source signature becomes a relatively short time pulse. The autocorrelation result may be independent from the travel path z within the borehole and, therefore, in-phase for all borehole receivers, which allows further stacking to minimize random noise. The autocorrelation is always zero-phase which means that time shifts between different events can easily be picked because they coincide with local maxima.

Figure 15A:
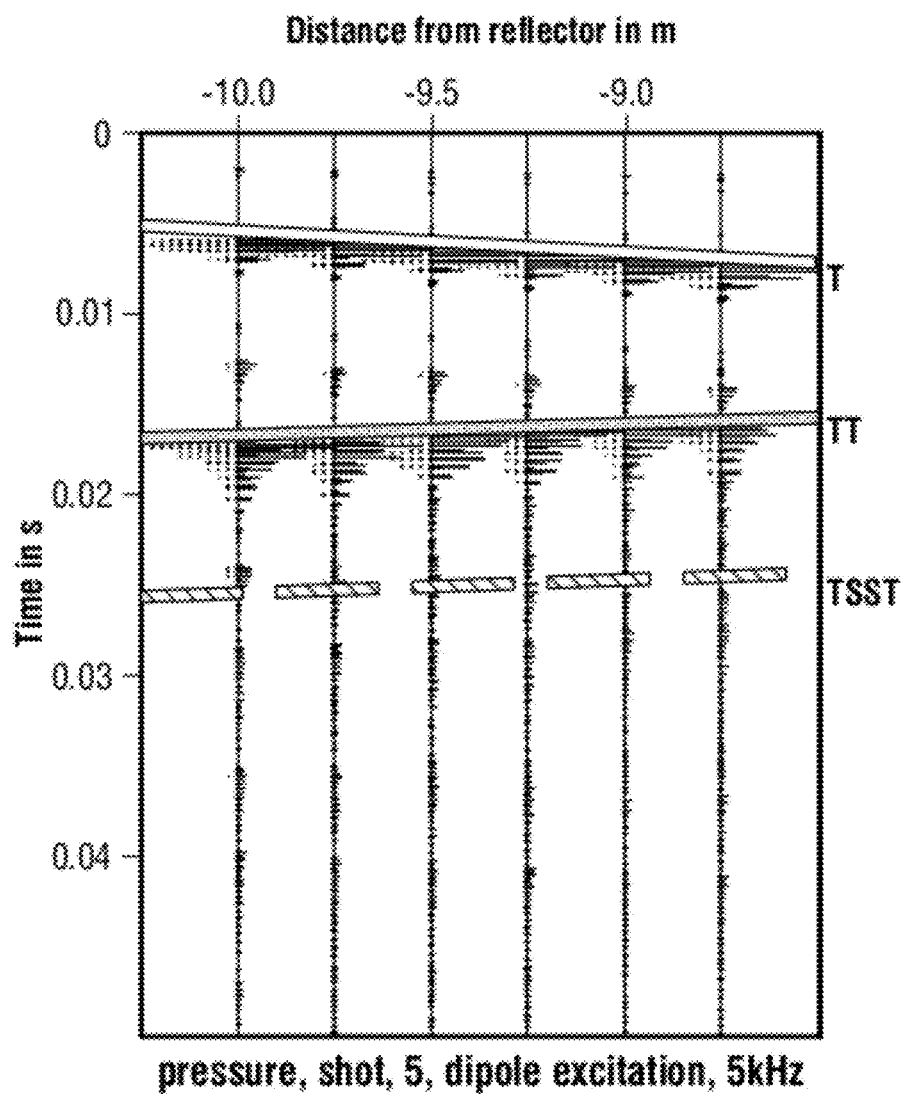
FIG. 15A shows shot gather data with the borehole bottom 5 m away from the reflector prior to auto-correlation.
Figure 15B:
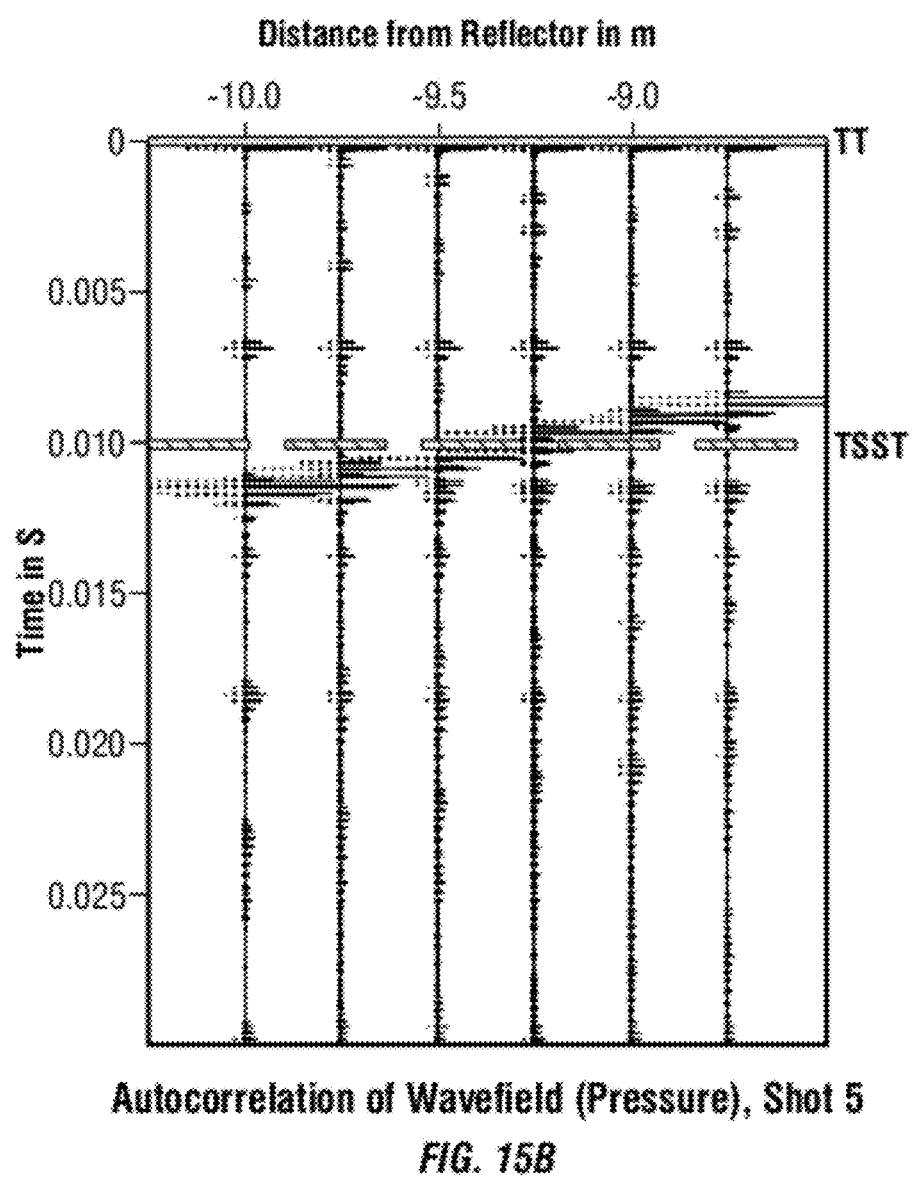
FIG. 15B shows shot gather data after auto-correlation. The TSST-signal is not visible. Its theoretical arrival time is indicated by a yellow dashed line. Wavefield separation in UP- and DOWN-going waves was not applied to the synthetic data. In contrast to real data, the model contains only one reflector. There are no reflectors above the source position in the model. For this reason the auto-correlation can be applied to the total wavefield.

The autocorrelation function may make more contributions if more than two wave types are present in the wave field, however, unwanted contributions of waves with different moveout in the seismogram would be imaged with a dip in the corresponding autocorrelated seismogram and could be removed by dip-sensitive filters. In some embodiments, the T and TT-waves may be separated from the recorded wavefield and be cross-correlated with the total wavefield. FIG. 15A gives an example of a shot section with UP and DOWN going waves. FIG. 15B shows the associated autocorrelated section.

Autocorrelation makes it theoretically possible to use the drill bit signal as source. The drill bit may excite a direct borehole guided wave travelling along the drill string and, in addition, radiate seismic waves into the formation. Reflections may couple back to the borehole as guided wave modes. The correlation of a direct bit-generated wave and a S-wave reflection from the formation may yield a maximum at the time shift $t_{SS}$, which is equal to the time shift between TT- and TSST-waves when using active sources. Additionally, the drill bit may radiate P-waves into the formation. The time shift between the direct drill bit generated wave and a converted P-reflection would be equal to the two-way travel time of the P-wave $t_{PP}$ between bit and reflector.

Figure 16:
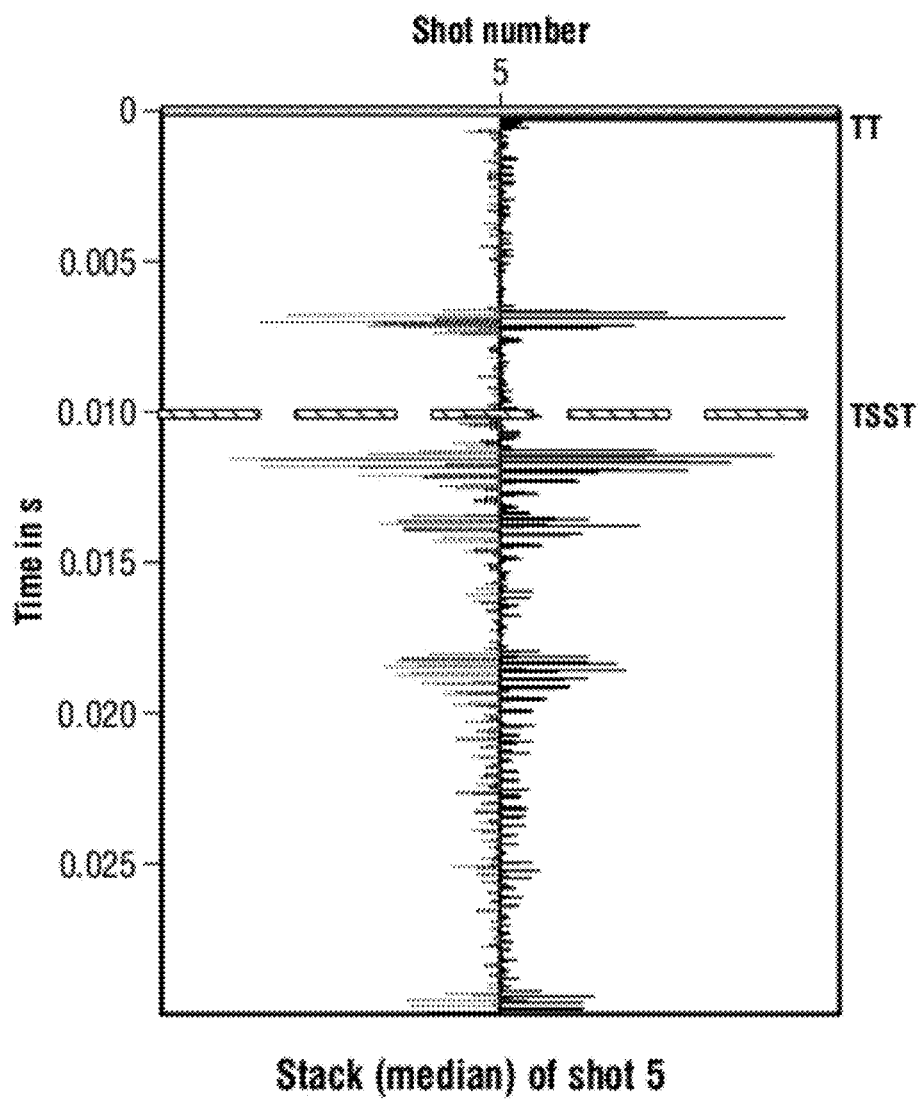
FIG. 16 shows auto-correlated shot gather data after the application of a dip filter and stacking.

In step 1430, the arrivals of TT- and TSST-waves may be characterized by the same moveout in a shot gather provided that they both propagate as same wave mode up the borehole. The contribution from the TT- and TSST-waves to the autocorrelated shot section may have a horizontal moveout. The same holds true for all (multiple) reflections within the borehole. All events that exhibit a dip in the autocorrelated shot section may be removed by dip-dependent filtering. These dipping events in the correlated shot section, as for example the correlation of T- and TT-waves, correspond to the contribution of waves with different moveouts. Subsequent stacking of all traces within the shot gather reduces random noise (FIG. 16). The signal-to-noise ratio is improved by the factor $\sqrt{N}$ with N denoting the number of stacked traces. A median filter including a defined number of neighboring traces is one possible implementation of such a dip-sensitive filter. Instead of the application of this type of median filter and subsequent stacking, it is also possible to take the median of all traces for each time sample. The resulting traces of all shot sections form a CRG.

In step 1435, the down-going wavefield recorded at a receiver position can be regarded as a source signature of a down-going wave. This wave may be reflected at different points below the receiver. The up-going wavefield may then turn out to be the convolution of the down-going wave field with the impulse response of the system below the receiver. This impulse response may be related to a series of reflection coefficients below the receiver position, which stands for contrasts in the elastic formation properties or in the tool parameters. Accordingly, it is possible to obtain these reflection coefficients by deconvolution of the up-going wave field with the down-going wave field and, thus, to suppress multiple reflections from above the receiver position. However, sometimes deconvolution may not improve the data quality, especially when the separation of up- and down-going waves is not successful for various reasons. In cases where the separation is not successful, step 1435 may be neglected, and the subsequent steps have to be applied to the correlated up-going wave field.

Figure 17A:
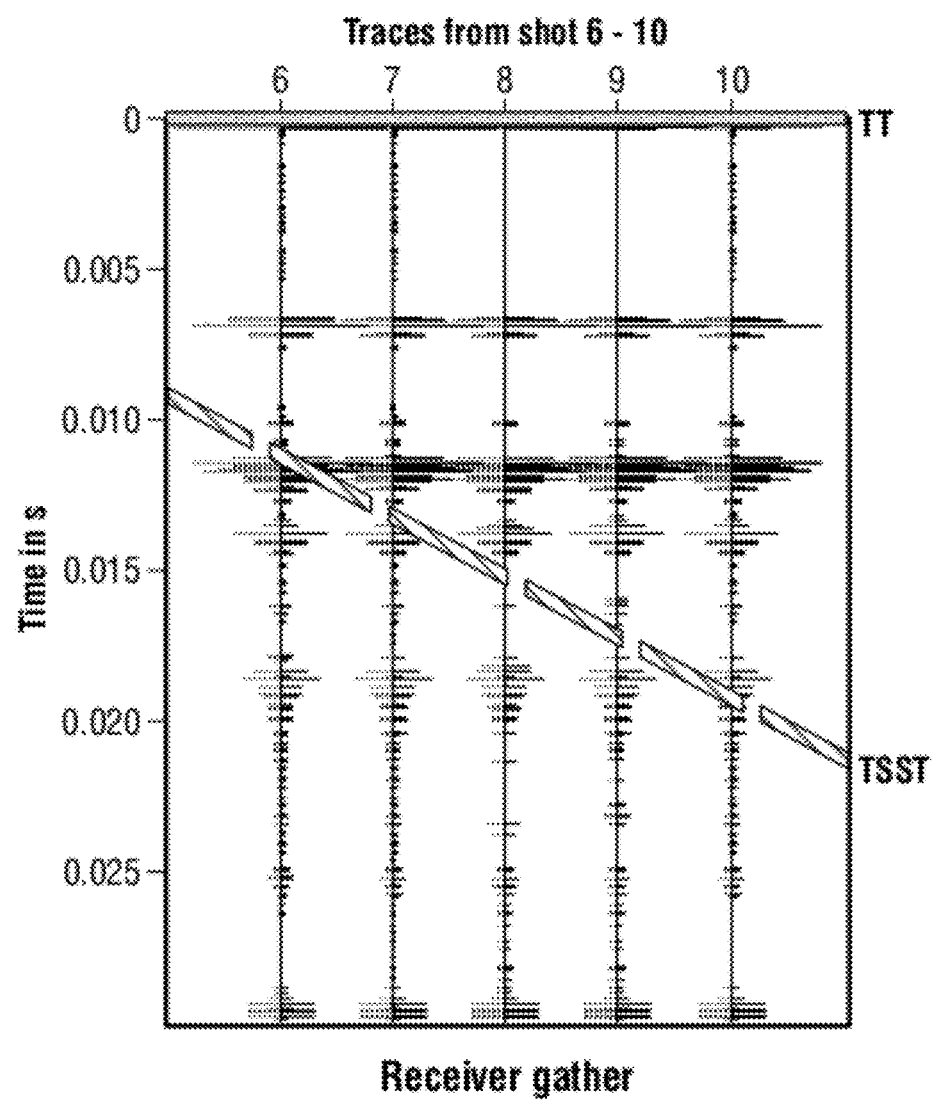
FIG. 17A (in color) shows auto-correlated Common-Receiver-Gather (CRG) data prior to the application of dip filtering.
Figure 17B:
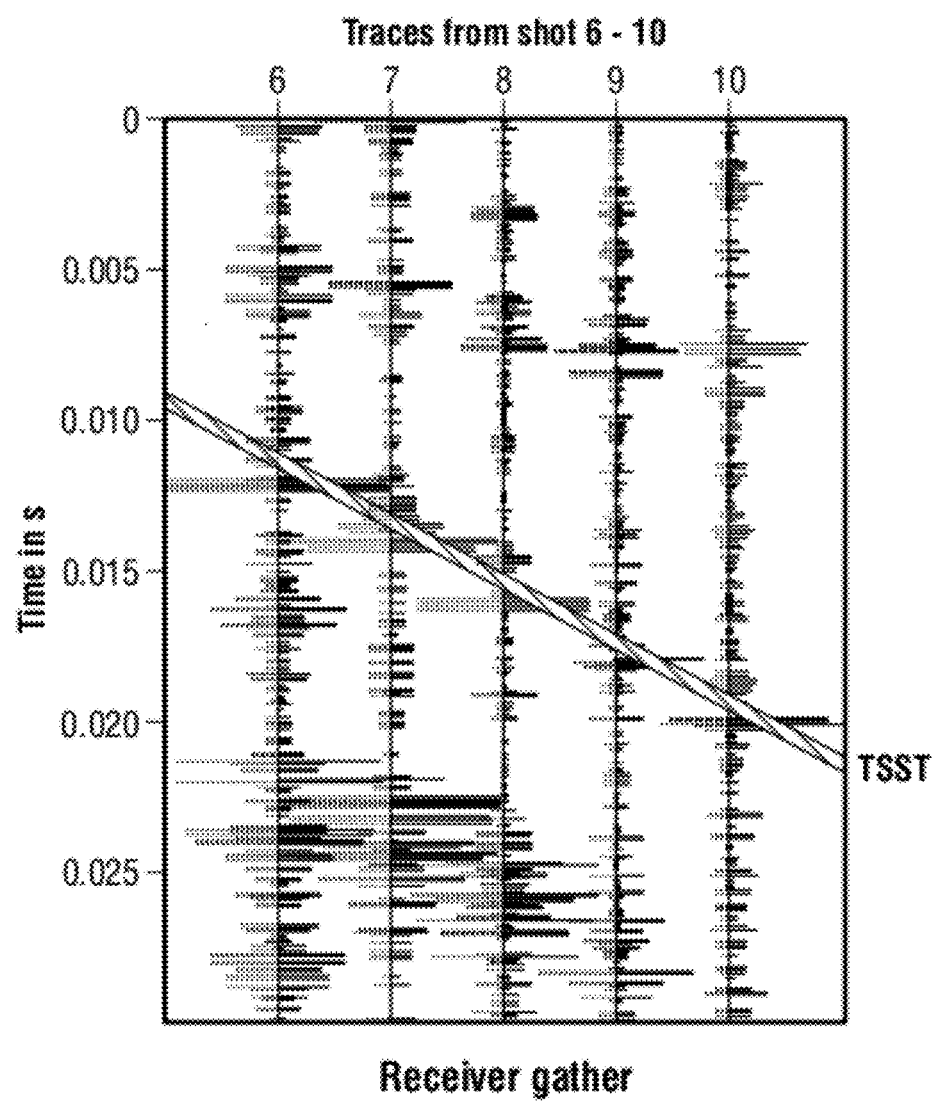
FIG. 17B (in color) shows auto-correlated Common-Receiver-Gather (CRG) data after the application of dip filtering: The TSST-signal becomes visible after filtering.

In step 1450, dip filtering may again be applied, this time to remove horizontal events. Horizontal events, which correspond to (multiple) reflections within the borehole, may be subtracted from the input traces. After the successful application of the dip filter (such as a median filter), the TSST-signals may become visible. When the drill bit approaches the reflector, the travel time of the TSST-signal may decrease, and, thus, it has a distinct moveout in a receiver gather. In contrast, the travel times of all reflections due to the structure of the drilling tool (e.g. the TT-reflection at the drill bit) may remain constant in a receiver gather as long as no strong variations in formation velocity occur along the borehole because the travel paths inside the borehole do not change. Reflections from above the receiver unit caused by layer interfaces that have already been intersected by the borehole would show a similar moveout like the TSST signals with opposite sign, however, these reflections are not any longer present in the data since only the (deconvolved) up-going wave field is processed. For illustration, FIG. 17A shows a receiver gather before the application of dip filtering in step 1450, and FIG. 17B shows a receiver gather after the application of dip filtering. The dip filtering filters noise such that the signals due to reflections may be seen along a line TSST.

In step 1455, $t_{SS}$ and $p_a$ may be derived from the filtered receiver gather by slowness-time-coherence analysis. The energy of a slant stack may be plotted within a certain time window normalized by the total energy of all involved windowed traces. The slowness-time-coherence plot shows a maximum if an event can be tracked along different receiver positions. The apparent slowness $p_a$ is connected with the moveout of the event and its intercept time $\tau$ depends on a reference position. In the following equation adopted from Kimball et al. (1984), the intercept time is equal to the arrival time at receiver 1.

$$STC_A(p, \tau; T) = \frac{1}{N} \frac{\int_{t=0}^{T} \left(\sum_{i=1}^{N} a_i(t^*)\right)^2 dt}{\sum_{i=1}^{N} \int_{t=0}^{T} (a_i(t^*))^2 dt}$$

$$t^* = t + (z_i - z_1) \cdot p + \tau$$

where $a_i(t^*)$ denotes the measured amplitude at time $t^*$ at the i-th receiver. The parameter T represents the window length and should be 2-3 times the period of the event one wants to determine the apparent slowness of. The axial coordinate, $z_i$ denotes the distance between the 'source' and the i-th receiver. N denotes the total number of receivers.

The determination of the distance s is independent of the wave type which is used for imaging. Both, PP- and SS-reflections would be imaged at the same distance s because the ratio of their two-way travel time between drill bit and reflector and their apparent slowness is equal. This is not longer true for the determination of reflector dip $\phi$ which depends on the P- or S-wave velocity of the formation.

Figure 13:
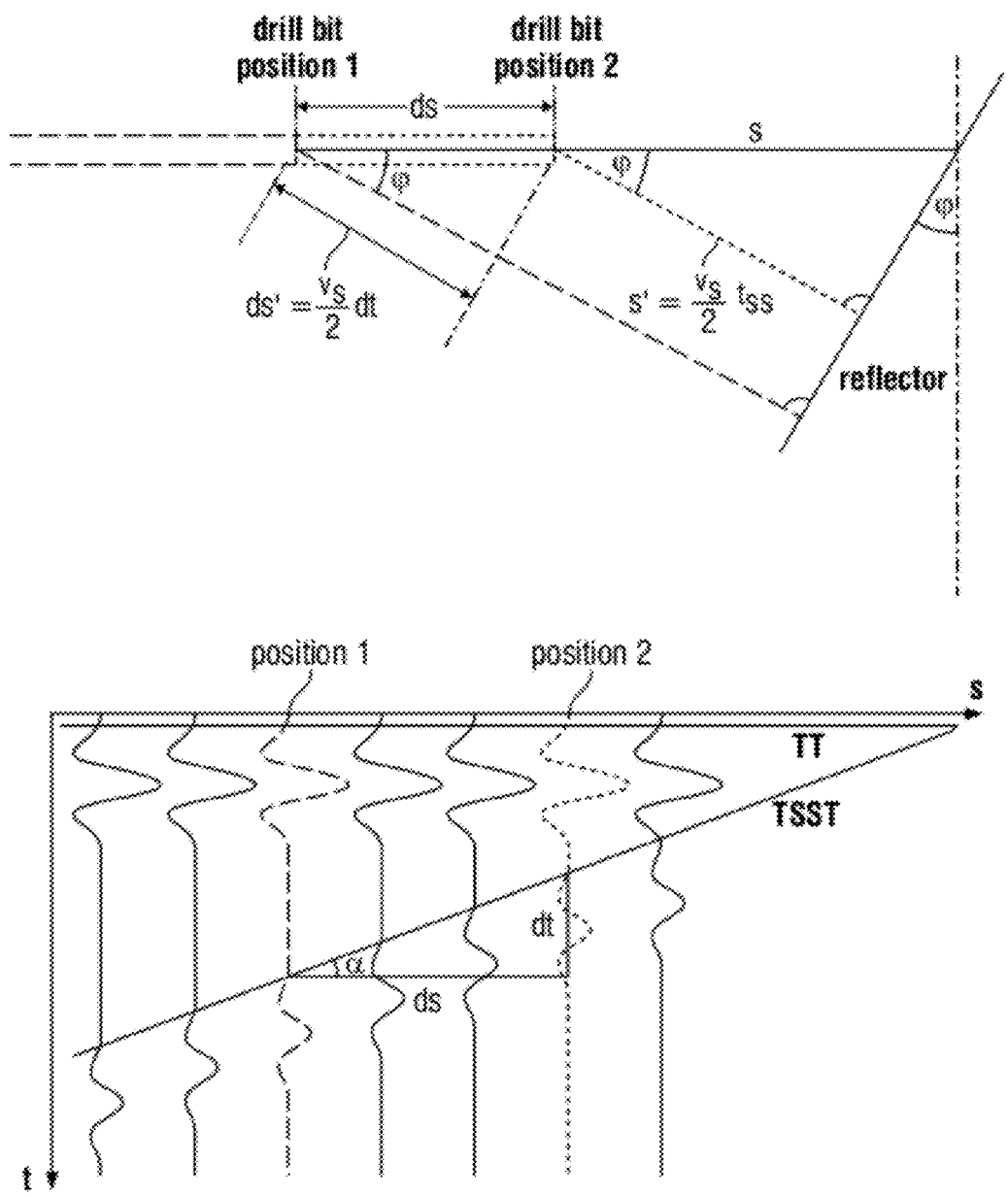
FIG. 13 illustrates how the dip $\phi$ of a plane reflector and its distance s'-along the borehole axis can be determined.

In step 1460, reflector distance s may be determined. FIG. 13 shows two different drill bit positions, where s denotes the distance between drill bit and reflector along the borehole axis whereas s' denotes half the travel path of the converted wave perpendicular to the reflector. ds is the distance between the two shot positions and ds' is half the difference of the corresponding travel paths between two shots. The reduced travel time $t_{SS}$ of the TSST-wave is equal to $$t_{SS} = \frac{2s}{v_s} \cos\varphi$$

with $v_S$ being the formation S-wave velocity and $\phi$ being the reflector dip. The dip angle $\alpha$ of the TSST-wave that can be observed in the receiver gather is $$\tan\alpha = \frac{dt}{ds} = p_a = \frac{2}{v_s}\cos\varphi$$

where $p_a$ denotes an apparent slowness that characterizes the observed moveout of the TSST-signal. The following expressions for reflector distance s (FIG. 13) and dip angle $\phi$ (step 1465) can be derived from the equations above:

$$s = \frac{t_{SS}}{\tan\alpha} = \frac{t_{SS}}{p_a}$$

$$\varphi = ar\cos\left(\frac{v_s}{2}\tan\alpha\right) = ar\cos\left(\frac{v_s}{2}p_a\right)$$

The determination of the reflector distance, s, is independent of the wave type traveling through the formation.

This means that the reflector distance is only dependent on the reduced TSST travel time $t_{SS}$ and on the apparent slowness $p_a$. No additional formation parameters have to be known. Unlike the distance s, the reflector dip $\phi$ may only be determined if the formation S-wave velocity $v_S$ is also known. Reflector dip $\phi$ may be estimated from the velocity of defined borehole guides waves as it is done in conventional borehole logging. For example, quadrupole waves propagate at true formation S-wave velocity at their low frequency limit (cut-off).

In step 1470, the azimuthal orientation $\theta$ of the reflector may be determined. The conversion characteristics of different waves at the drill bit and the orientation of sources with higher order than monopole have to be considered. Depending on the polarization of borehole guided waves, formation areas with a certain azimuth are illuminated by the bit-converted waves due to their conversion characteristics. The same holds true for the back-conversion of S-waves at the drill bit. Depending on the angle of incidence (dip and azimuth) at the bit, characteristic borehole guided wave modes with characteristic polarization are excited at the bit. This information could be used to determine the azimuthal orientation of the reflector ahead of the bit.

The dip filtered CRG may be used as input in migration algorithms that are suited for imaging structures ahead of the drill bit with a minimum number of downhole receivers. One possible implementation of a migration algorithm may be a phase shift migration with a modified imaging condition (beam migration). The filtered seismic traces of the CRG are shifted by the travel time $\Delta t$ depending on the distance between the accordant receiver position $\vec{x}_j$ and an image point $\vec{x}'$ and on a given velocity model v in the vicinity of the borehole, and the accordant amplitude is imaged at $\vec{x}'$ (phase shift migration). Thus the signals caused by reflectors or scatterers are smeared on the isochrone around the drill bit position. Constructive superposition of these images can be observed at the true reflector position. Normally, a high number of seismic traces is needed to obtain good images. The necessary number of traces can be reduced considerably if the incidence angle of the reflections is used as additional input in the migration process. This information helps to limit the image to the actual reflector position. The incidence angle can be derived from the apparent slowness of reflections observed in adjacent seismic traces. For this purpose the ratio of coherent and total signal energy of the time shifted traces within the time interval $$\left[-\frac{\tau}{2}, +\frac{\tau}{2}\right]$$

around t=0 can be used as weighting factor for the above described migration process. It reaches values between 0 (no coherence) and 1 (high coherence). High coherence means that the incident wave originates from the direction where the reflector is whereas low coherence means that the apparent slowness observed at the different drill bit positions cannot be explained by a wave originating from that direction. In order to further suppress directions with low coherence, an exponent p≥1 can be added to the weighting function.

$$A'(t, \vec{x}_j, \vec{x}') = \int_{-\infty}^{+\infty} A(\omega, \vec{x}_j) \exp(i\omega \Delta t(\vec{x}_j, \vec{x}', v)) \exp(i\omega t) d\omega$$

$$W_{\tau, M_j}(\vec{x}') = \frac{1}{N} \frac{\int_{-\tau/2}^{\tau/2} \left| \sum_{k=1}^{M} A'_k(t, \vec{x}_j, \vec{x}') \right|^n dt}{\int_{-\tau/2}^{\tau/2} \left| \sum_{k=1}^{M} A'_k(t, \vec{x}_j, \vec{x}') \right|^n dt}$$

$$I_{\tau, M}(\vec{x}') = \frac{1}{N} \sum_{j=1}^{N} W_{\tau, M_j}(\vec{x}')^p A'(t=0, \vec{x}_j, \vec{x}')$$

Figure 19A:
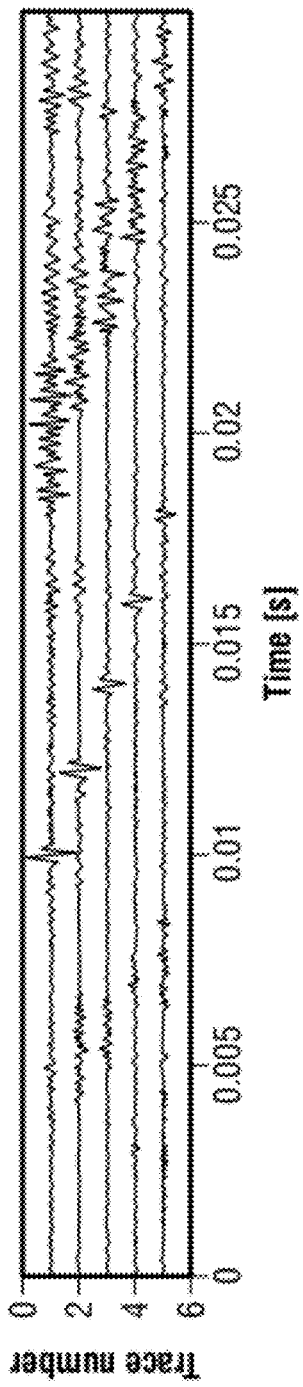
FIG. 19A (in color) shows the filtered CRG data as input to migration.
Figure 19B:
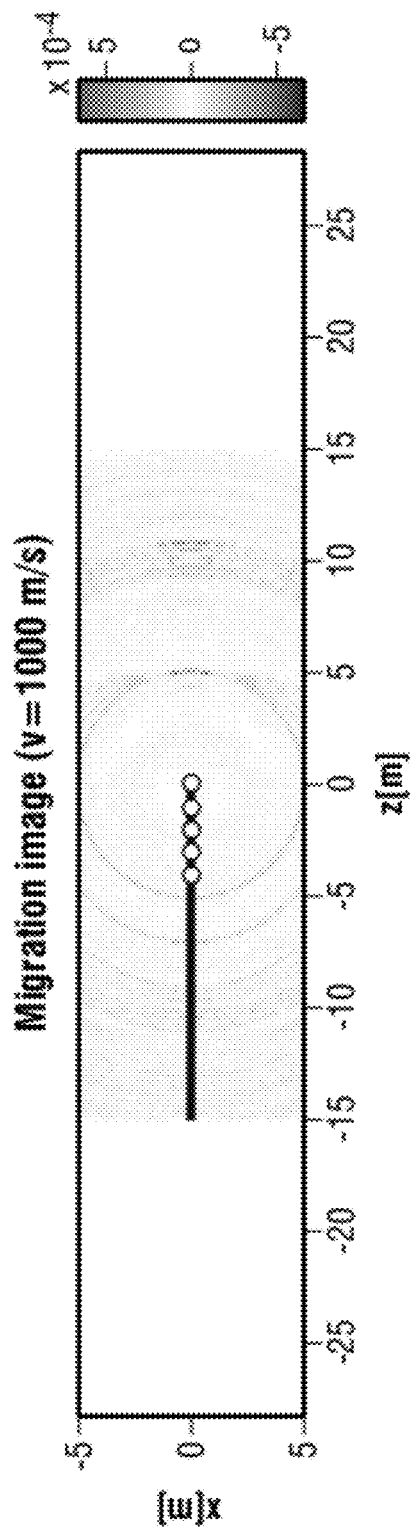
FIG. 19B (in color) result of the conventional phase shift migration.

The image $I(\vec{x}')$ in the equation above is the sum of all phase shifted traces $A'(t, \vec{x}_j, \vec{x}')$ at t=0 weighted with the weighting functions $W_{\tau, M_j}(\vec{x}')$. $\Delta t(\vec{x}_j, \vec{x}', v)$ represents the travel time from drillbit $\vec{x}_j$ to image point, $\vec{x}'$.

$$\Delta t(\vec{x}_j, \vec{x}', v) = \frac{2}{v}\left(|\vec{x}' - \vec{x}_0| + \frac{(\vec{x}' - \vec{x}_0) \cdot (\vec{x}_j - \vec{x}_0)}{|\vec{x}' - \vec{x}_0|}\right)$$

gives the two way travel time with respect to drill bit position $\vec{x}_j$ and image point $\vec{x}_j$ for a plane reflector.

$$\Delta t(\vec{x}_j, \vec{x}', v) = \frac{2}{v}|\vec{x}' - \vec{x}_j|$$

gives the two way travel time between the drill bit position $\vec{x}_j$ and the image point $\vec{x}'$ FIG. 18a shows a dip-filtered auto-correlated, Common-Receiver-Gather in the:

FIG. 18b shows a slowness-time-court hearings coherence plot of the data in FIG. 18a;

FIG. 19a shows the filtered CRG that is input to the migration.
  FIG. 19b shows the result of a conventional phase shift migration without applying the weighting function.
  FIG. 19c. Shows the weighting function obtained from all 5 traces of the CRG, and FIG. 19d shows the result of the weighted phase shift migration. As can be seen, the image of the reflector 1901 at 5 m is more clearly defined in FIG. 19d.

Coherence as imaging condition in a migration algorithm makes it possible to detect the incidence angle of reflections from formation structures around the borehole without using multi-component receivers and thus to limit the image to this angle range. The fact that only a few seismic traces are needed in order to produce good images qualifies this migration technique for borehole applications. Thus beam migration may be used to image subsurface structures based on TSST-reflection data. This special type of migration is not restricted to TSST imaging. It may also be applied to data acquired by other seismic borehole methods, which focus not so much on formation structures ahead of the drill bit (look ahead) but for example around the borehole (look away). Borehole methods have the disadvantage that source and receiver locations are restricted to the drill path. For this reason it is almost impossible to distinguish between incident reflections with different azimuth θ. 3D beam migration would therefore image a reflector as circle around the borehole. The application of borehole sources with a characteristic azimuthal radiation pattern, such as dipole source arrays or other sources radiating their energy in a certain direction, may be used to reduce the ambiguity.

Also implemented into the evaluation model (if applicable) is additional information helpful for the evaluation of the measured data. This could be a stratigraphic and velocity model of the subsurface resulting from the surface seismic, nearby well information, LWD/MWD data measured simultaneously to the disclosure's measurement process, etc. Some of this information is implemented before run into the borehole, others are updated/fed in while drilling.

The description above has been in terms of a device conveyed on a BHA on a drilling tubular into a borehole in the earth formation. The method and apparatus described above could also be used in conjunction with a logging string conveyed on a wireline into the earth formation. For the purposes of the present disclosure, the BHA and the logging string may be referred to as a "downhole assembly." It should further be noted that while the example shown depicted the transmitter assembly and the receiver assembly on a single tubular, this is not to be construed as a limitation of the disclosure. It is also possible to have a segmented acoustic logging tool to facilitate conveyance in the borehole.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation velocities and boundary locations may be recorded on a suitable medium and used for subsequent processing upon retrieval of the BHA. The determined formation velocities and boundary locations may further be telemetered uphole for display and analysis.

While the foregoing disclosure is directed to the one mode embodiments of the disclosure, various modifications will be apparent to those skilled in the art. It is intended that all variations be embraced by the foregoing disclosure.

We claim:

1. A method of determining a distance to an interface in an earth formation, the method comprising:
  (a) conveying a logging instrument into a borehole;
  (b) activating at least one transmitter on the logging instrument to produce a guided acoustic wave which propagates downward to the bottom of the borehole and produces an acoustic wave in the earth formation;
  (c) using at least one receiver on the logging instrument to:
    receive a first signal responsive to the downward propagating guided acoustic wave, and
    receive a second signal responsive to an upward propagating guided acoustic wave resulting from reflection of the acoustic wave in the formation at an interface therein;
  (d) auto-correlating the first signal and the second signal;

(e) filtering the auto-correlated first signal and the auto-correlated second signal using a dip filter; and
(f) estimating from the filtered auto-correlated first signal and the filtered auto-correlated second signal a distance to the interface.

2. The method of claim 1 further comprising:
applying a median filter to an auto-correlated Common Shot Gathers (CSG);
deconvolving the filtered auto-correlated second signal by the filtered auto-correlated first signal; and
applying a median filter to an auto-correlated Common Receiver Gather (CRG).

3. The method of claim 1 further comprising:
estimating a dip angle and an azimuth of the interface;
imaging the reflector by performing migration using coherence as an imaging condition.

4. The method of claim 1 further comprising decomposing the guided acoustic wave into its multipole constituents.

5. The method of claim 1 further comprising performing a phase shift migration using an apparent slowness of observed reflections.

6. The method of claim 1 wherein the acoustic wave in the formation further comprises a shear wave.

7. The method of claim 1 further comprising:
controlling a direction of drilling using the determined distance.

8. An apparatus configured to estimate a distance to an interface in an earth formation, the apparatus comprising:
a logging instrument configured to be conveyed into a borehole;
at least one transmitter on the logging instrument configured to produce a guided acoustic wave which propagates downward to the bottom of the borehole and produces an acoustic wave in the earth formation;
at least one receiver on the logging instrument configured to:
receive a first signal responsive to the downward propagating guided acoustic wave, and
receive a second signal responsive to an upward propagating guided acoustic wave resulting from reflection of the acoustic wave at the borehole bottom and in the formation at an interface therein; and
at least one processor configured to:
auto-correlate the first signal and the second signal;
filter the auto-correlated first signal and the auto-correlated second signal using a dip filter; and
estimate from the filtered auto-correlated first signal and the filtered auto-correlated second signal a distance to the interface.

9. The apparatus of claim 8 wherein the at least one processor is further configured to estimate a dip angle and an azimuth of the interface.

10. The apparatus of claim 8 wherein the guided acoustic wave further is a multipole wave mode.

11. The apparatus of claim 8 wherein the at least one transmitter further comprises a plurality of transmitters that are at least one of: (i) axially disposed on the logging instrument, and (ii) circumferentially disposed on the logging instrument.

12. The apparatus of claim 8 wherein the at least one processor is further configured to perform a phase shift migration using an apparent slowness of an observed reflection.

13. The apparatus of claim 8 wherein the acoustic wave in the formation further comprises a shear wave.

14. The apparatus of claim 8 wherein the at least one processor is further configured to perform a wavefield separation into an UP-going wavefield and a DOWN-going wavefield representing the first signal and the second signal, and
wherein auto-correlating the first signal and the second signal comprises auto-correlating the UP-going and DOWN-going wavefield.

15. The apparatus of claim 9 wherein the at least one processor is further configured to control a direction of drilling using the determined distance.

16. The apparatus of claim 9 further comprising a conveyance device configured to convey a downhole assembly including the logging tool, the conveyance device selected from: (i) a wireline, and (ii) a drilling tubular.

17. A computer-readable medium product having stored thereon instructions that when read by a processor enable the processor to execute a method, the method comprising:
estimating a distance from a bottom of a borehole to an interface in an earth formation using a first signal and a second signal by:
auto-correlating the first signal and the second signal;
filtering the auto-correlated first signal and the auto-correlated second signal using a dip filter; and
estimating from the filtered auto-correlated first signal and the filtered auto-correlated second signal a distance to the interface,
wherein:
the first signal is produced by a receiver on a logging instrument conveyed in a borehole responsive to a downward propagating guided acoustic wave in the borehole; and
the second signal is produced by the receiver responsive to an upward propagating guided seismic wave in the borehole, the upward propagating wave resulting from reflection of an acoustic wave produced at the bottom of the borehole by the downward propagating guided acoustic wave and reflected at the interface.

18. The computer-readable medium product of claim 17 further comprising at least one of (i) a ROM, (ii) an EAROM, (iii) an EPROM, (iv) an EEPROM, (v) a flash memory, and (vi) an optical disk.

19. The method of claim 1 wherein the dip filter is configured to remove horizontal events.

* * * * *